(12) United States Patent
Matsunaga et al.

(10) Patent No.: US 7,505,873 B2
(45) Date of Patent: Mar. 17, 2009

(54) CUSTOMER SUPPORT SYSTEM AND METHOD OF CUSTOMER SUPPORT

(75) Inventors: Wataru Matsunaga, Kanagawa (JP); Kazuyoshi Mihara, Kanagawa (JP); Toshio Takagi, Kanagawa (JP)

(73) Assignee: Amada Company, Limited, Kanagawa (JP)

( * ) Notice: Subject to any disclaimer, the term of this patent is extended or adjusted under 35 U.S.C. 154(b) by 0 days.

(21) Appl. No.: 11/231,995

(22) Filed: Sep. 22, 2005

(65) Prior Publication Data

US 2006/0074603 A1    Apr. 6, 2006

Related U.S. Application Data

(63) Continuation-in-part of application No. 10/936,498, filed on Sep. 9, 2004.

(51) Int. Cl.
G06F 15/00 (2006.01)
G06F 17/40 (2006.01)
G06F 11/00 (2006.01)

(52) U.S. Cl. .................................. 702/188; 702/187
(58) Field of Classification Search .............. 702/187, 702/188
See application file for complete search history.

(56) References Cited

U.S. PATENT DOCUMENTS 5,485,391 A * 1/1996 Lindstrom .................. 700/175
5,913,184 A * 6/1999 Girbig ........................ 702/182
6,061,668 A 5/2000 Sharrow .................... 705/400
6,298,377 B1 10/2001 Hartikainen et al. ........ 709/223
2002/0052844 A1 5/2002 Schoop ....................... 705/41
2002/0169514 A1 11/2002 Eryurek et al. ............. 700/110
2003/0009313 A1 1/2003 May et al. .................. 702/188
2003/0154144 A1 8/2003 Pokorny et al. .............. 705/28
2004/0073469 A1 4/2004 Emori ........................ 705/8
2004/0078310 A1* 4/2004 Shaffer ........................ 705/35
2004/0133397 A1* 7/2004 Bjornson .................... 702/185
2004/0186759 A1* 9/2004 Fukui et al. ................... 705/7
2004/0204775 A1* 10/2004 Keyes et al. ................. 700/29
2005/0033468 A1 2/2005 Pate et al. .................. 700/110

FOREIGN PATENT DOCUMENTS

EP     0964325    12/1999
EP     1357484    10/2003
WO     01/50099    7/2001

* cited by examiner

Primary Examiner—Eliseo Ramos Feliciano
Assistant Examiner—Janet L Suglo
(74) Attorney, Agent, or Firm—Greenblum & Bernstein, P.L.C.

(57) ABSTRACT

A method is provided for centrally monitoring machines running at remote customer sites and providing customers with adequate support. The method includes collecting machine operating data, including data for each process stage, at the customer sites, and analyzing, at a central location, the collected machine operating data for each machine. Subsequently, a solution based upon the analysis is proposed to the customer for each of the machines, and the solution is then implemented. The method also includes continuously collecting data to check effectiveness of the installed machines and to verify the solution works.

20 Claims, 26 Drawing Sheets

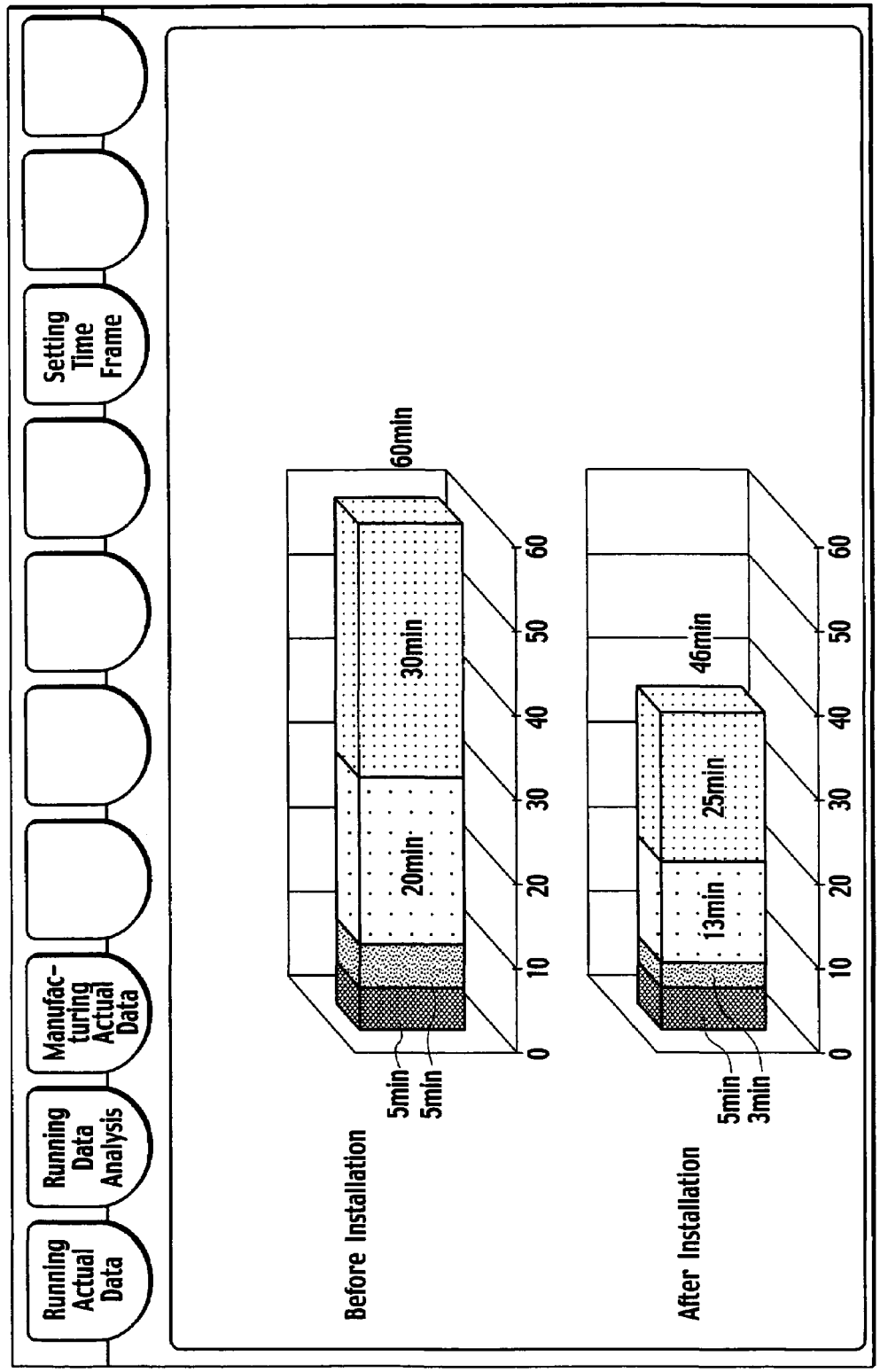

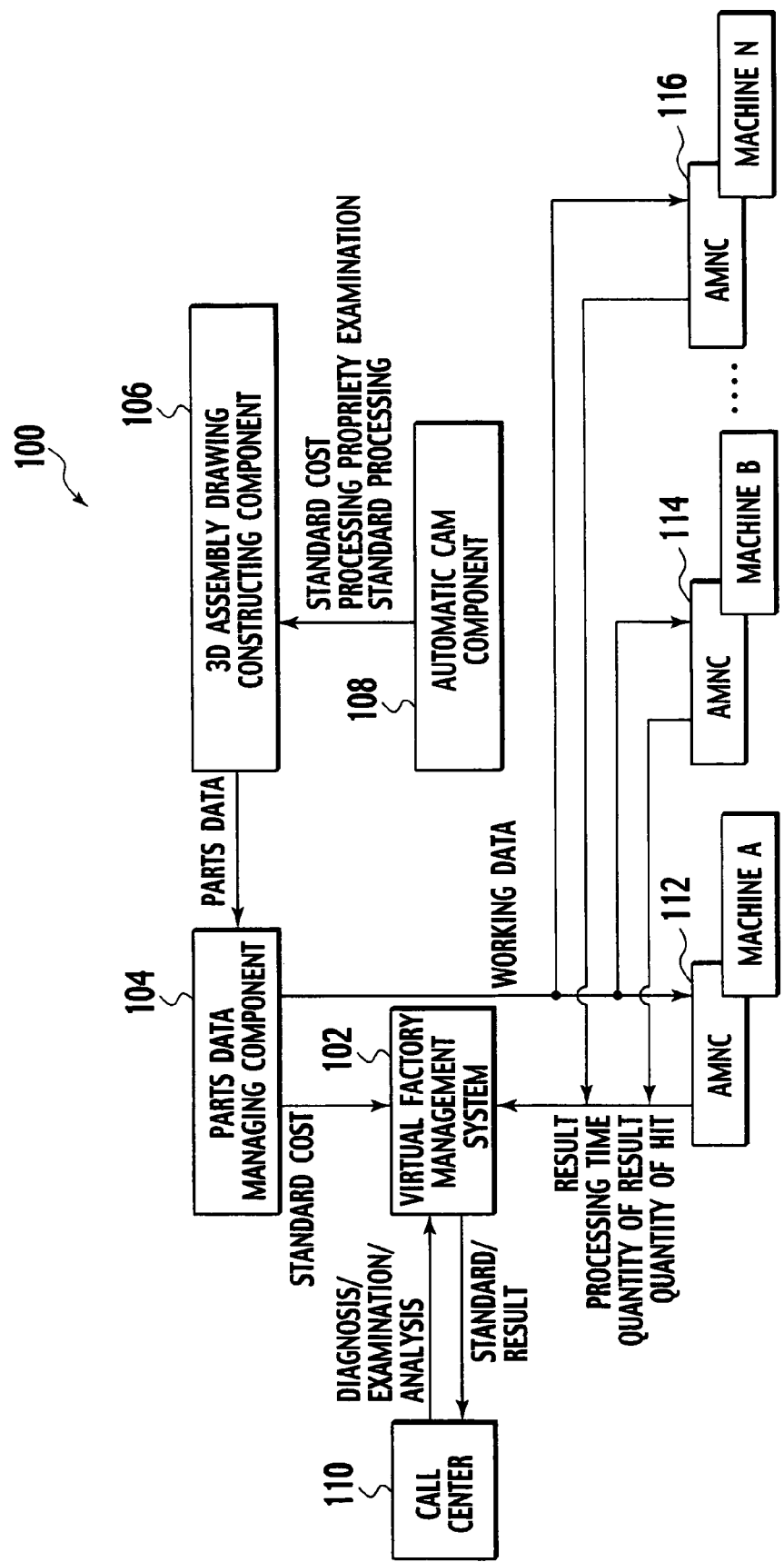

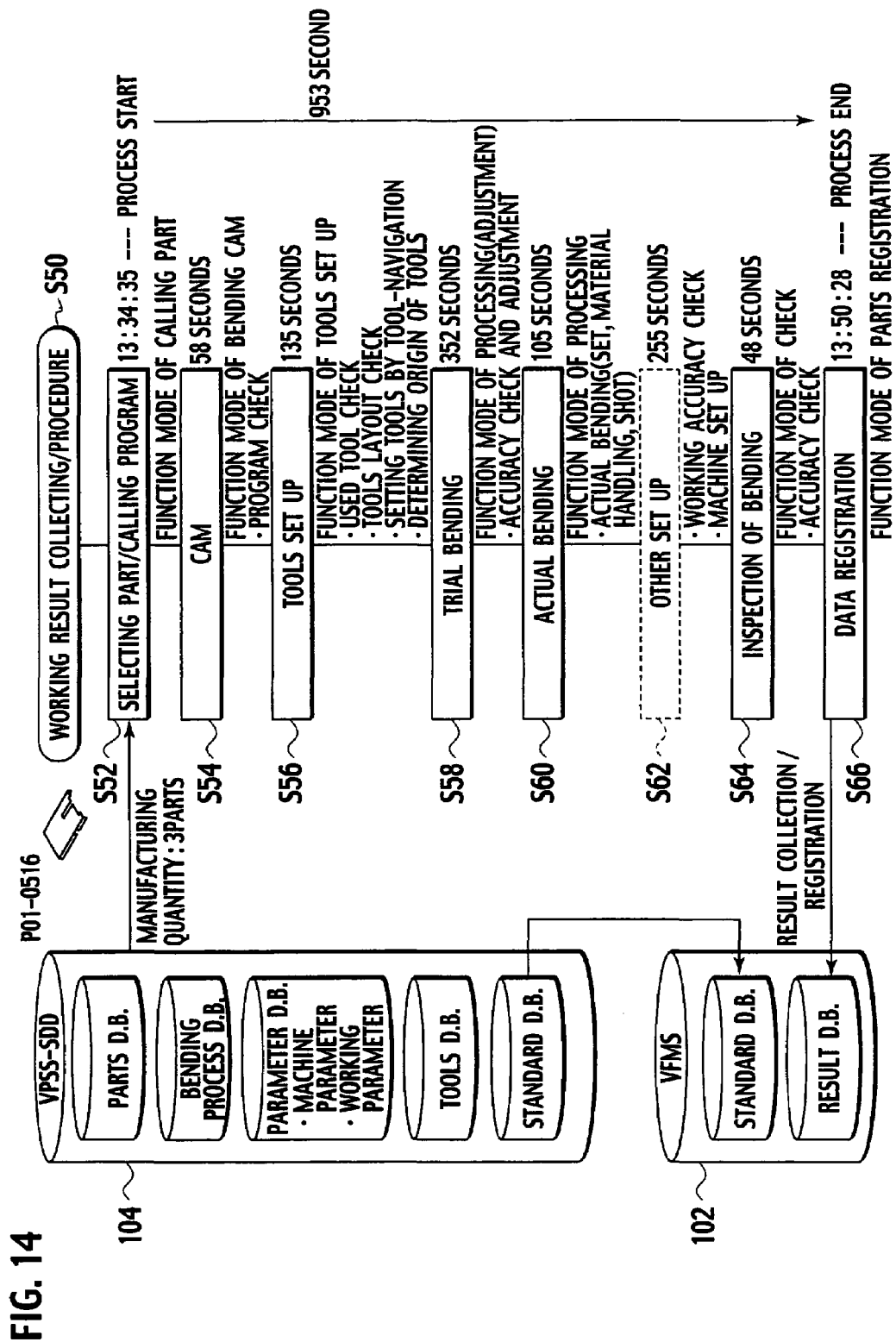

FIG. 18

| PROCESS | WORKING 1 | WORKING 2 | WORKING 3 | WORKING 4 | ... | WORKING N | TOTAL |
|---|---|---|---|---|---|---|---|
| WORKING TIME | t1 | t2 | t3 | t4 | ... | tn | T |
| MACHINE WORKING TIME | - | - | tm3 | tm4 | ... | - | Tm |
| OPERATOR WORKING TIME | tp1 | tp2 | tp3 | - | ... | tpn | Tp |

FIG. 20
PARTS NUMBER : P01-0516
MANUFACTURING QUANTITY : 3 PARTS
MACHINE 1 (CURRENT) : RG80
MACHINE 2 (SUGGESTION, RESULT) : HDS8025
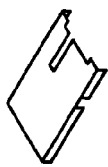
| WORKING PROCESS | CAM | TOOLS SET UP | MACHINE SET UP | TEST BENDING | ACTUAL BENDING | INSPECTION BENDING | TOTAL |
|---|---|---|---|---|---|---|---|
| STANDARD 1 (CURRENT) | 142 | 389 | 278 | 700 | @51 | 56 | 1,616 |
| STANDARD 2 (SUGGESTION) | 67 | 167 | 197 | 451 | @19 | 56 | 956 |
| RESULT | 64 | 150 | 283 | 391 | @19(57) | 53 | 962(998) |
| STANDARD 1 VS RESULT | 78 | 239 | -6 | 309 | @32 | 2 | 654 |
| STANDARD 2 VS RESULT | 2 | 17 | -87 | 60 | @0 | 2 | -6 |
(UNIT : SECOND)
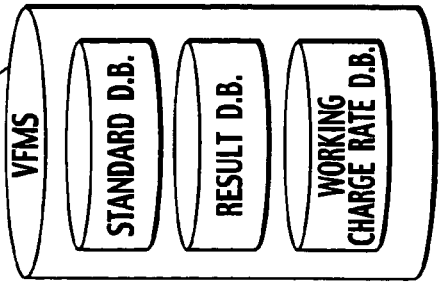

FIG. 23

| PART NUMBER / PART NAME(COMMENT) | 3D DRAWING | TYPE | PUNCHING PROCESS | | LASER CUTTING PROCESS | | TAPPING PROCESS | | BENDING PROCESS | | WELDING PROCESS | |
|---|---|---|---|---|---|---|---|---|---|---|---|---|
| | | | MACHINE | OPERATOR | MACHINE | OPERATOR | MACHINE | OPERATOR | MACHINE | OPERATOR | MACHINE | OPERATOR |
| AA-1234-BBBB ASSY-AA | 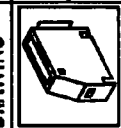 | CURRENT | | | | | | | | | 5.5min ¥165 | 12.0min ¥720 |
| | | SUGGESTION | | | | | | | | | | |
| AA-1234-B11 SIDE COVER | 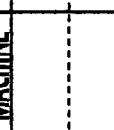 | CURRENT | 1.8min ¥99 | 7.0min ¥280 | | | | | 3.2min ¥96 | 4.2min ¥168 | | |
| | | SUGGESTION | 1.2min ¥60 | 3.5min ¥140 | | | | | 1.6min ¥48 | 2.1min ¥84 | | |
| AA-1234-B12 FRONT COVER |  | CURRENT | 1.7min ¥91 | 6.2min ¥248 | | | | | 5.8min ¥174 | 6.8min ¥272 | | |
| | | SUGGESTION | 1.1min ¥55 | 3.1min ¥124 | | | | | 2.8min ¥87 | 3.4min ¥136 | | |
| AA-1234-B21 STAY COLUMN | 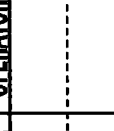 | CURRENT | 0.8min ¥41 | 7.2min ¥288 | | | 0.5min ¥15 | 5.5min ¥220 | | | | |
| | | SUGGESTION | 0.5min ¥15 | 3.6min ¥144 | | | | | | | | |
| AA-1234-B31 BASE PART | 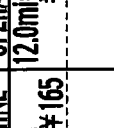 | CURRENT | 0.5min ¥25 | 6.0min ¥240 | | | | | 10.2min ¥306 | 11.2min ¥448 | | |
| | | SUGGESTION | 0.3min ¥15 | 3.0min ¥120 | | | | | 5.1min ¥153 | 5.6min ¥224 | | |
| BB-1234-CCC ATTACHMENT PLATE | 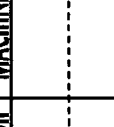 | CURRENT | 5.1min ¥281 | 8.0min ¥320 | | | 0.4min ¥12 | 3.0min ¥120 | 3.0min ¥90 | 4.0min ¥160 | | |
| | | SUGGESTION | 3.4min ¥150 | 4.0min ¥160 | | | | | 1.5min ¥45 | 2.0min ¥80 | | |
| CC-1234-DDDD INSERT PART |  | CURRENT | | | 3.0min ¥300 | 6.0min ¥240 | | | 3.0min ¥90 | 4.0min ¥160 | | |
| | | SUGGESTION | | | 2.0min ¥180 | 3.0min ¥120 | | | 1.5min ¥45 | 2.0min ¥80 | | |

FIG. 24

| ORDER NUMBER | PART NUMBER PART NAME(COMMENT) | 3D DRAWING | QUANTITY | PUNCHING + TAPPING PROCESS | | LASER CUTTING PROCESS | | BENDING PROCESS | | WELDING PROCESS | |
|---|---|---|---|---|---|---|---|---|---|---|---|
| | | | | MACHINE | OPERATOR | MACHINE | OPERATOR | MACHINE | OPERATOR | MACHINE | OPERATOR |
| 1234-5678-00 | AA-1234-BBBB ASSY-AA | | 40 | 192min ¥9,600 @ 3.1min ¥145 | 33min ¥1,320 13.2min ¥528 | | | 448min ¥13,440 9.6min ¥288 | 451min ¥18,040 11.1min ¥444 | 220min ¥6,600 5.5min ¥165 | 480min ¥28,800 12.0min ¥720 |
| 1234-5678-01 | AA-1234-B11 SIDE COVER | | 80 | 96min ¥4,800 @ 1.2min ¥60 | 9min ¥360 3.5min ¥140 | | | 128min ¥3,840 1.6min ¥48 | 129min ¥5,160 2.1min ¥84 | | |
| 1234-5678-02 | AA-1234-B12 FRONT COVER | | 40 | 44min ¥2,200 @ 1.1min ¥55 | 12min ¥480 3.1min ¥124 | | | 116min ¥3,480 2.9min ¥87 | 117min ¥4,680 3.4min ¥136 | | |
| 1234-5678-03 | AA-1234-B21 STAY COLUMN | | 80 | 40min ¥2,000 @ 0.5min ¥15 | 8min ¥320 3.6min ¥144 | | | | | | |
| 1234-5678-04 | AA-1234-B31 BASE PART | | 40 | 12min ¥600 @ 0.3min ¥15 | 4min ¥160 3.0min ¥120 | | | 204min ¥6,120 5.1min ¥153 | 205min ¥8,200 5.6min ¥224 | | |
| 1234-5679-00 | BB-1234-CCC ATTACHMENT PLATE | | 5 | 17min ¥850 @ 3.4min ¥170 | 20min ¥800 4.0min ¥160 | | | 8min ¥225 1.5min ¥45 | 9min ¥360 2.0min ¥80 | | |
| 1234-5680-00 | CC-1234-DDDD INSERT PART | | 10 | @ | | 20min ¥1,800 2.0min ¥180 | 30min ¥1,200 3.0min ¥120 | 15min ¥450 1.5min ¥45 | 16min ¥640 2.0min ¥80 | | |

CUSTOMER SUPPORT SYSTEM AND METHOD OF CUSTOMER SUPPORT

This application is a Continuation-in-Part of U.S. application Ser. No. 10/936,498, filed on Sep. 9, 2004, the subject matter of which is expressly incorporated herein in its entirety.

TECHNICAL FIELD

The present invention relates to the field of customer support. More particularly, the present invention relates to monitoring and supporting machinery installed at a customer's premises.

BACKGROUND ART

In conventional, current customer support systems require manual collection of data. Thus, real time analysis of the data is not possible.

It would be desirable to have an automated monitoring system that continuously monitors installed machines. Such a system would facilitate support of the installed machinery and ensure effectiveness of the machines.

In view of the foregoing, the present invention is directed to continuously monitoring installed sheet metal machinery.

Therefore, one object of the present invention is to provide a customer support method and a customer support system where a factory can easily know how to change machines to be used to gain the profit increase.

DISCLOSURE OF THE INVENTION

In order to achieve the object mentioned above, in accordance with a first aspect of the present invention, there is provided a method for centrally monitoring machines running at remote customer sites and providing customers with adequate support. The method includes collecting machine operating data for each process stage at the customer site. The method also includes analyzing, at a central location, the collected machine operating data for one of the machines. The method further includes proposing to a customer a solution based upon the analysis, and implementing the solution. The data is continuously collected to check effectiveness of the installed machines and to verify the solution works. The method may also include researching a machine status before machine installation. In one embodiment, the proposal is for a profit increase based upon current data. The machine operating condition data may include a machine operation log, graphics images of the operating machine, a maintenance history, and a history of purchased parts.

The analyzing may include comparing a manufacturing time for a product after an upgrade with a target manufacturing time for the product. The analyzing may also include comparing a newly installed machine's performance with an old machine's performance. The analyzing may further include comparing a processing time for a product on a newly installed machine with a known average processing time for the product. The analyzing can also include analyzing a long term trend.

In another aspect of the present invention, a method is provided for installing a new machine. The method includes frequently recording machine operating conditions for the machine, including information for each process stage, which was installed at a remote location, and analyzing the recorded data at a central location. The method further includes suggesting new products and/or services to solve problems found through analysis, and ordering new products immediately. After the new products are delivered, installation effectiveness is continuously monitored.

In yet another aspect of the present invention, a method is provided for maintaining a machine installed at a remote location. The method includes frequently recording machine operating conditions for each process stage, and analyzing the collected data. The method also includes suggesting machine maintenance or parts to solve a problem found through analysis, and immediately ordering and delivering parts that solve the problem. The problem and solution are reported to the customer, and the machine is continuously monitored to verify that the problem was solved. The problem may be a problem predicted based upon a history of machine operating conditions. The problem may also be a current problem detected from decreased performance indicated by the machine operating conditions.

In yet another aspect of the present invention, a system provides customer support of newly upgraded machinery and/or newly installed machinery. The system includes machines to be monitored, each located at a customer site, and an operating data monitoring and collection system that monitors the machines. The system also includes a call center that receives data from the operating data monitoring and collection system, including data for each process stage, and records the data for analysis. The call center may prepare a proposal based upon the analysis, the proposal being presented to a customer. In one embodiment, the data includes a machine operation log, and graphics images of the operating machine.

The analysis may include comparing a manufacturing time for a product after an upgrade with a target manufacturing time for the product, comparing a newly installed machine's performance with an old machine's performance, and/or comparing a processing time for a product on a newly installed machine with a known average processing time for the product.

In yet another embodiment, the system also includes portable devices that communicate with the call center, the portable devices being operated by a sales representative or a service engineer. One of the portable devices may collect data for each stage of a process by transmitting to the call center a indication of a beginning of the process, and when the process completes, transmitting to the call center an indication of an ending of the process.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which:

FIGS. 7A, 7B, and 7C show examples of a product analysis, in accordance with an aspect of the present invention.

FIG. 8 illustrates another exemplary support system, in accordance with another aspect of the present invention;

FIG. 14 shows working result collecting and processing block diagrams and flows;

FIG. 18 shows a table of working time;

FIG. 20 shows a table of working cost;

FIGS. 23 and 24 show cost tables in the varied working processes;

BEST MODE FOR CARRYING OUT THE INVENTION

A description will be in detail given below of embodiments of a processing method of a formed product in accordance with the present invention, and an upper metal mold and a lower metal mold used for the method.

First, the present invention is directed to a system that enables centralized support of installed machinery by continuously monitoring the installed machinery.

The system keeps track of the customer's machine operating conditions accurately and suggests products and services based on the data recorded during operation.

An object of the present invention is to explain to customers the effectiveness of the installed machine based upon a comparison of costs before and after installation.

Another object of the present invention is to continuously monitor and support machine operation until recognizing the planned effectiveness.

It is another object of the present invention to continuously monitor the operating machines and suggest maintenance services, such as supporting, examining and replacing consumable supplies.

It is a further object to monitor the operating machines to discover problems, and then suggest solutions.

Thus, the present invention continuously and accurately understands a customer's conditions, and provides appropriate suggestions and support until achievement of planned targets.

In one aspect of the present invention, a machine home doctor (MHD) team is assigned to operate and support the system. The team can be formed with a sales representative and a service engineer.

Figure 1:
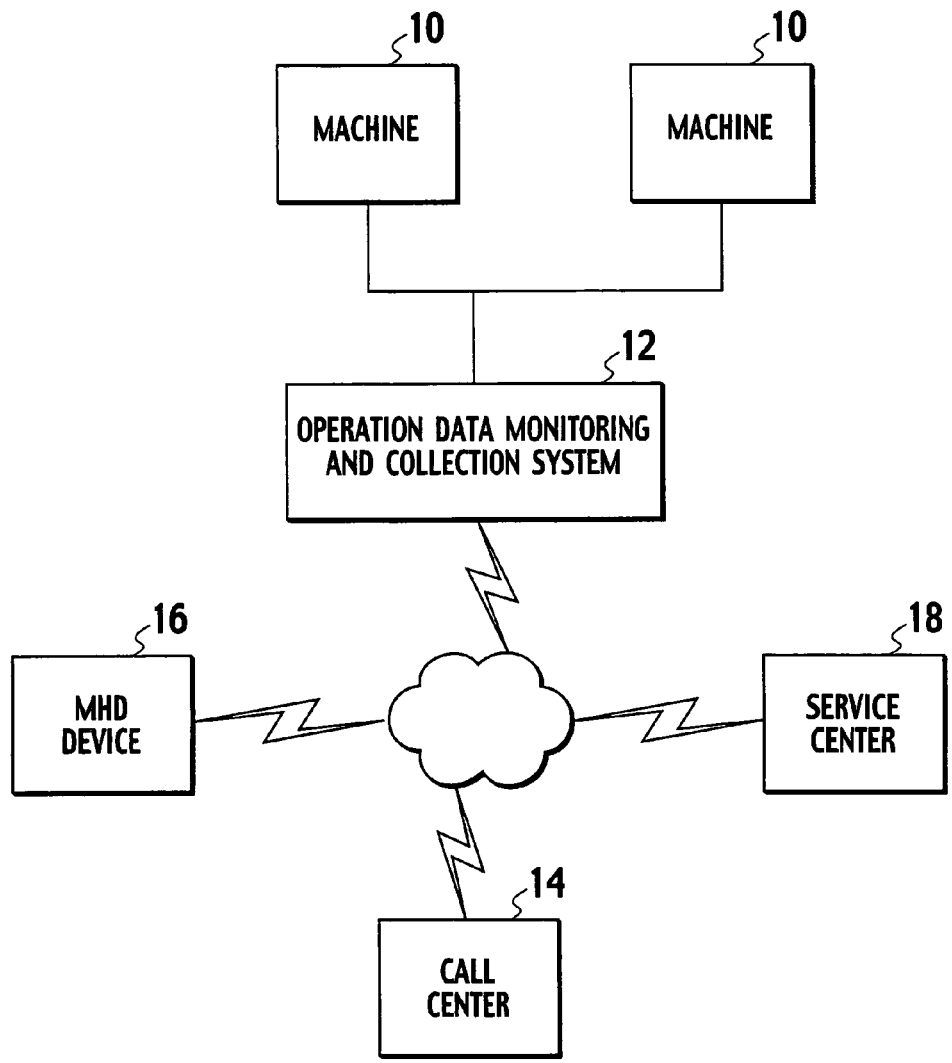
FIG. 1 illustrates an exemplary support system, in accordance with an aspect of the present invention.

Referring to FIG. 1, an exemplary support system will be described. Sheet metal machines 10 can be installed at a customer site. In one embodiment, the machines 10 are networked together. The machines are connected to an operation data monitoring and collection system 12 via a communication line. The operation data monitoring and collection system 12 continuously collects and monitors the data from the installed machines in the shop through the line of communication. The operation data monitoring and collection system 12 sends the collected machine operating data to a call center 14 at established intervals. The operation data monitoring and collection system 12 also sends graphics images to the call center 14 using a camera, which is installed on the machine 10. In case of an emergency, the operation data monitoring and collection system 12 automatically notifies, by e-mail or telephone, the call center 14.

The call center 14 receives information and stores the information for each customer. In one embodiment, the information is stored based upon the customer's name and the machine name. A data server may be provided to record achieved (archived) product information, machine operating information and manufacturing data.

Exemplary information received at the call center includes machine operating information and graphics image information received from the operation data monitoring and collection system 12. Other information can be received from an MHD device 16, such as a personal computer or a cellular telephone carried by the service engineers and/or sales representatives of the MHD team. Information received from an MHD device 16 can include customer correspondence, such as questions and answers, and/or graphics images, as well as time stamps associated with the data The PC that the service engineers or the sales representatives carry, can input, edit, and display customer information data, such as the customer's work data and requirements. The PC may also analyze machine operating information and then provide service and suggest product for customers. In one embodiment, part ordering software, e.g., Part Navigator available from SolidWorks Corporation of Concord Mass., is provided on the PC, enabling the service engineer and/or sales representative to easily and promptly order parts while on-site. In this case, the Part Navigator software is modified to include an order function and access to a database storing parts.

The cell phone that service engineers or sales representatives carry can input, record and send the service information and a time-stamp. The cell phone can also record and send graphics images, such as photographs. In case the operation data monitoring and collection system 12 is inoperable or not set up, the cell phone can record and send a customer's machine operating information manually. The cell phone also enables a service engineer and/or sales representative to quickly order parts by part code.

A service center 18 may also be provided to support and manage service engineers and sales representatives. The service engineers and sales representatives can communicate with the service center 18 via cell phone or PC.

Figure 2:
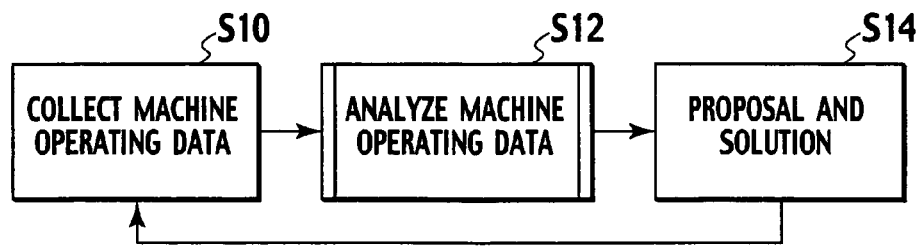
FIG. 2 show an overall customer support process, in accordance with an aspect of the present invention.

According to an aspect of the present invention, the customer support system can be used in a customer support process, which is shown in FIG. 2. Initially, the machine data is collected at S10. After the data has been collected, it is analyzed at step S12. Finally, a proposal can be presented. Alternatively, or in addition, a solution can be presented, at step S14. The process then continuously repeats. Each step of the overall process will be described in more detail below.

Exemplary customer information that can be collected will now be discussed. The customer information can include the actual machine operating data. This machine operating data is specific to the machine that is being monitored, and can include the number of different items manufactured each day, the quantity of the same items manufactured each day, the number of hits each day, the amount of processing time each day (excluding set up time), and the amount of material processed each day.

Figure 3:
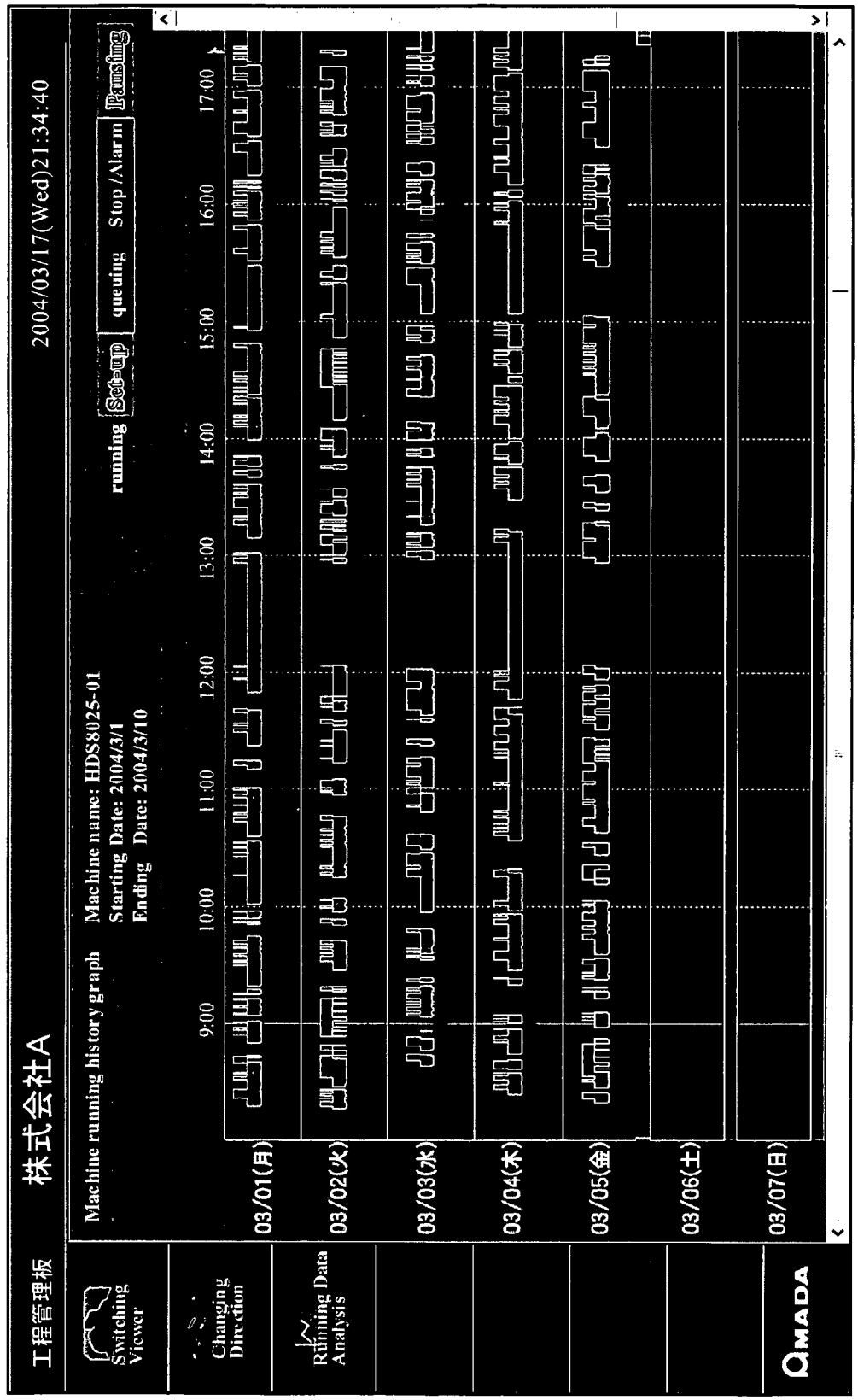
FIG. 3 shows an example of a machine's operating history, according to an aspect of the present invention.

Actual manufacturing data is also collected based upon manufactured product part information. Exemplary information includes the manufacturing time required for a product, the cost to manufacture the product, and the history of the machine while manufacturing the part. The history can show how much time was spent operating, setting up, queuing, stopping (because of alarms) and pausing. FIG. 3 shows an exemplary machine history.

Other customer information is based upon an overall analysis of the shop. The overall analysis, is of course focused on the machine operation. For example, in the case of an installed bending machine, how the customer is using software to obtain bend data is important Thus, the software used and how long the software was used, whether 3D models were used, the tools that were used, the number of bends performed by a bending machine, etc. can be recorded.

Other customer information can include graphics. For example, pictures can be taken of the final product or defect locations. Question and answer information, such as customer requirements, claims, and the data that would be forwarded to the development divisions can also be part of the customer information, as can the maintenance history and part replacement history.

The machine operating data is preferably collected by the operation data monitoring and collection system 12. However, if that system is unavailable manual collection can occur. In this case, one of the MHD devices 16 can be used to collect the manufacturing time of specific parts.

Figure 4:
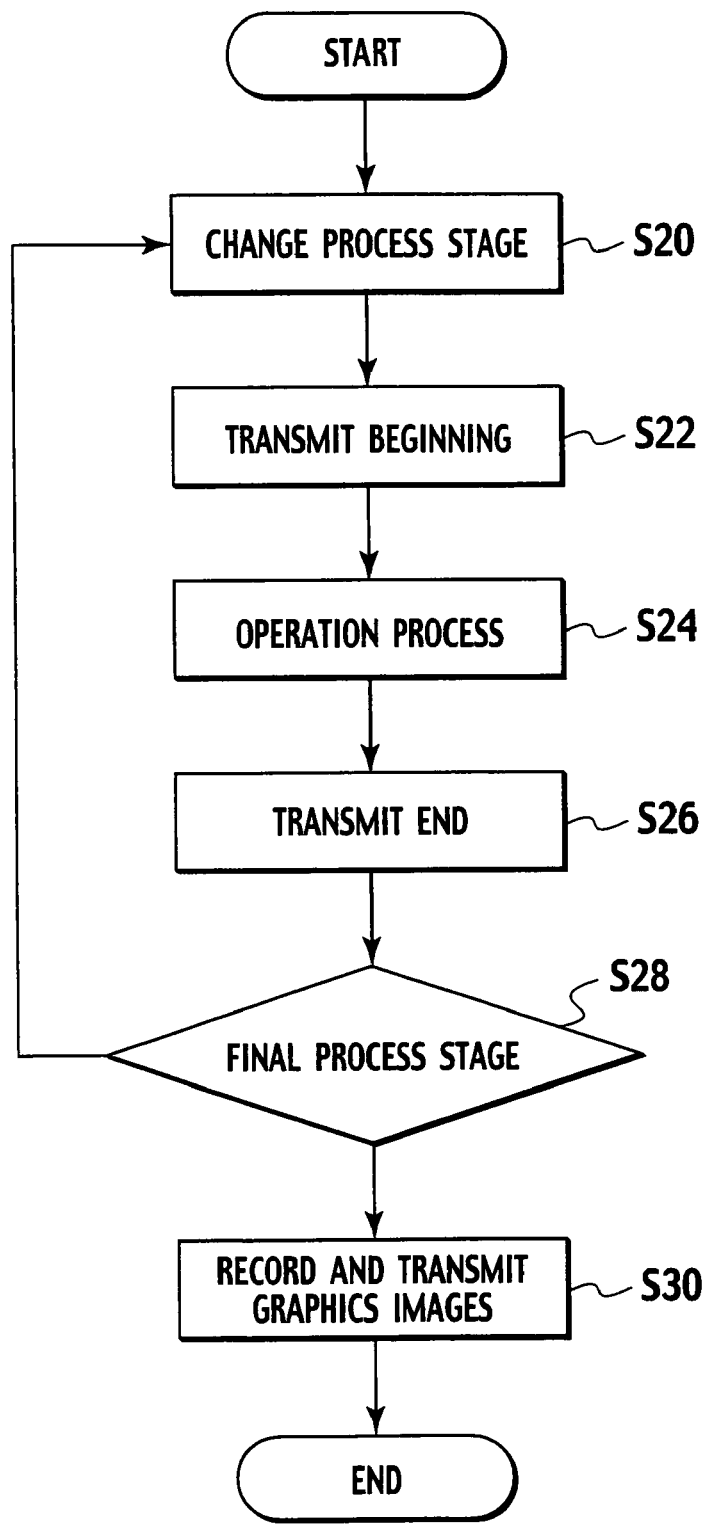
FIG. 4 shows a process for collecting machine operating data, according to an aspect of the present invention.

As shown in FIG. 4, the collection process includes several steps. Initially, the first process stage is set at step S20. In one embodiment, the following process stages are used to measure manufacturing time of a part: creating flats; sheet testing; double-checking; checking if the sheet is the same as the flat from the original drawing; verifying sheet manufacturing; selecting bend tool sequence; selecting bending machine data, e.g., L/D values; creating bend process data; machine set up; setting up the machine and bend tools; performing a bending test; and examination of the bent model.

After the process stage is set, the MHD device 16 connects to the call center 14 to indicate the start of the process, at step S22. Subsequently, the processing occurs, at step S24. Once the process is completed, the MHD device 16 indicates the same, at step S26. Then, it is determined if additional processing stages exist at step S28. If so, the process returns to step S20 and repeats with the next process stage. Otherwise, a graphics image is recorded and transmitted at step S30 and the process then ends.

Figure 5:
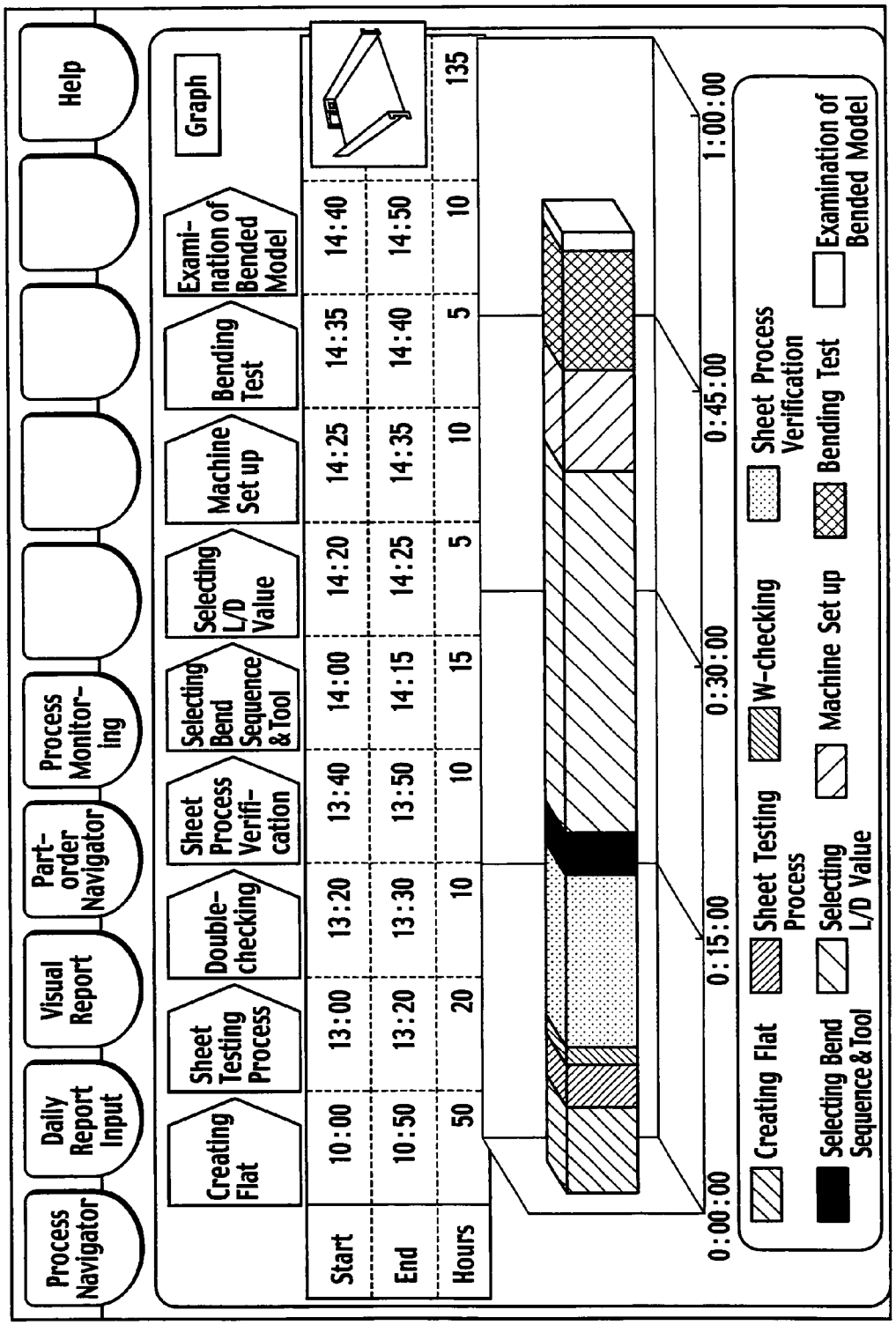
FIGS. 5 shows an example of collected machine operating data, in accordance with an aspect of the present invention.

A display showing an example of collected manufacturing time is shown in FIG. 5. In the example of FIG. 5, creating the flat required fifty minutes (hours/60), sheet test processing required twenty minutes (hours/60), double checking required nineteen minutes (hours/60), sheet process verification required ten minutes (hours/60), selecting the bend sequence and tooling required fifteen minutes (hours/60), selecting the L/D values required five minutes (hours/60), the machine set up required ten minutes (hours/60), the bending test required five minutes (hours/60), and the examination required ten minutes (hours/60). Thus, the overall time was 135 minutes (two hours and 15 minutes) FIG. 5 also includes a bar graph showing the percentage of time each process stage required.

The analysis of step S12 is now discussed in further detail.

After the time of each process stage is collected, evaluation of the time required to manufacture a product can occur by analyzing each step in the process. The collected machine operating data can be used for various purposes. For example, the efficiency of each individual step can be evaluated and problems can be spotted based upon the time required for the step.

Although the performance of each individual stage can be analyzed, such analysis may have limited value with respect to the overall manufacturing costs and efficiency. For example, new equipment directed to improving the efficiency of a first stage may indirectly reduce the time required for a second stage. In this case, even if the time for completing the first stage becomes longer than the pre-install time for that stage, the indirect improvement may outweigh the increased time for completing the first stage and therefore reduce the overall manufacturing time. Thus, measurement of the effectiveness of the new install/upgrade occurs for all of the stages.

Moreover, the duration of each stage can be used to calculate the total manufacturing cost, which can be provided to the customer as a target result. That is, the manufacturing cost for the product is a sum of the cost of each process stage.

In an embodiment of the present invention, several different types of analysis occur. A machine analysis can be performed, a product analysis can be performed, a time analysis can be performed, a historical data analysis can be performed, and a trend analysis can be performed. Each type of analysis will now be discussed in more detail.

The system of the present invention continuously collects data and analyzes the machines by comparing and verifying the effectiveness of the newly installed machine's operating performance versus the old machine's operating performance. More importantly, the machine analysis also compares a target value with the newly installed machine's operating performance. Such a comparison provides significant benefits, such as ensuring the installation is operating smoothly and showing unexpected results. If the post installation result is inferior to the targeted result, the present invention contemplates providing support (e.g., the MHD, customer support, etc.) to help achieve the targeted result The machine analysis can also be applied to the same machine before and after an improvement, e.g., a software upgrade.

Figure 6A:
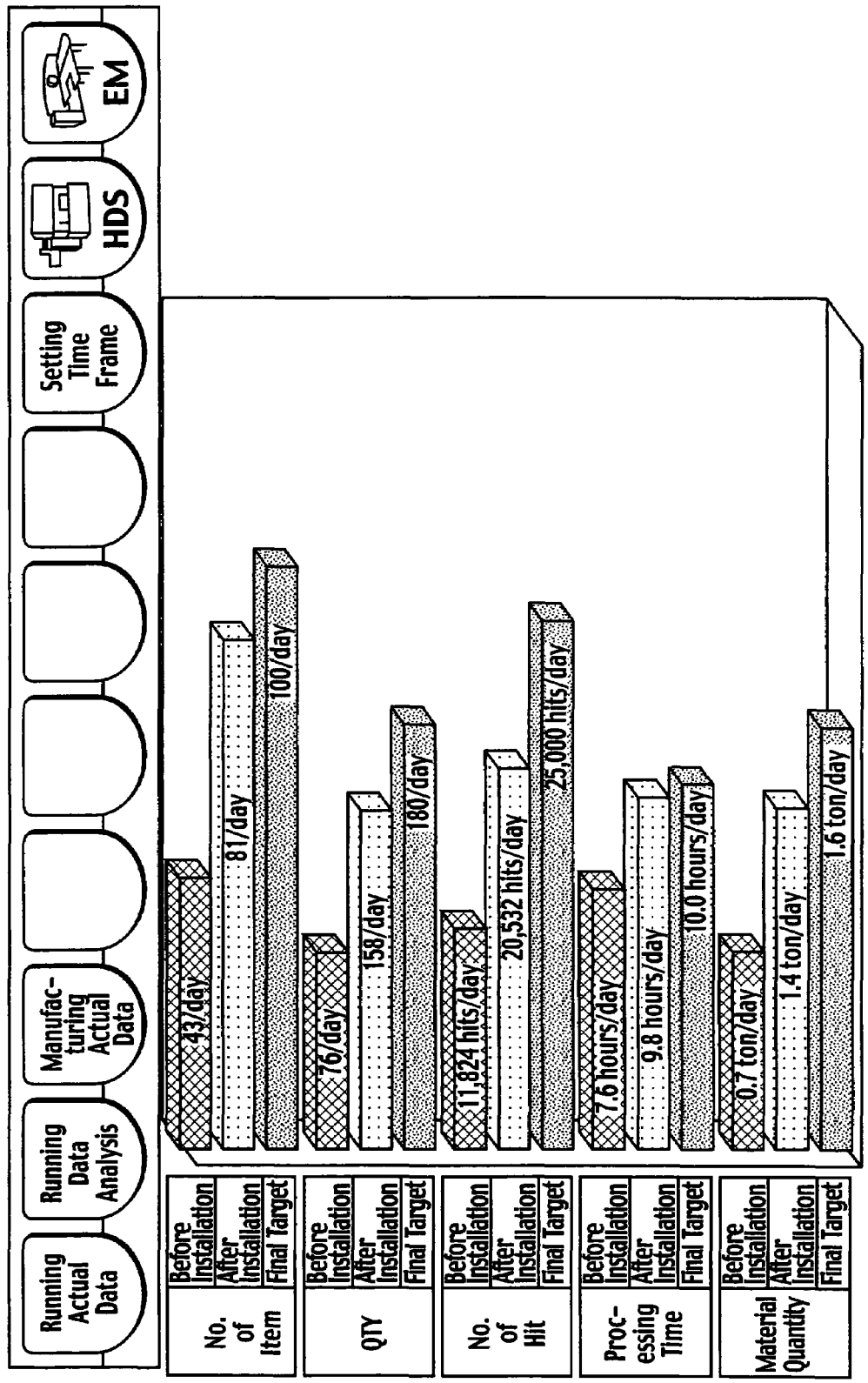
FIGS. 6A, 6B, and 6C show examples of a machine analysis, in accordance with an aspect of the present invention.

FIG. 6A shows an example of a machine analysis. It can be seen that before installation, only 43 different items were manufactured each day. After installation, 81 different items were manufactured, whereas the target is 100 items each day. Similarly, before installation, 76 units of an item were produced, 11,824 hits occurred each day, processing time was 7.6 hours each day, and 0.7 tons of material were processed each day. After installation, 158 units were produced each day, 20,532 hits occurred each day, processing occurred for 9.8 hours each day, and 1.4 tons of material were processed.

The target values are: 180 units of an item produced, 25,000 hits each day, 10 hours each day, and 1.6 tons of material being processed each day. In the example of FIG. 6A, the data collected after installation was collected automatically by the operation data monitoring and collection system 12 and the data from the old machine was collected when interviewing the customer. The target values can include: a consultant's estimate of the machine's production capacity on the customer's manufacturing application; a fixed value derived from a time study algorithm; or a manufacturing time of similar parts manufactured by the same installed machine. The time study data is derived from a simulation provided by manufacturing software. For example, the simulation can verify the process stages employed in a manufacturing process. Consequently, the user can calculate the manufacturing time (time study) in the simulation based upon the duration of each stage.

Figure 6B:
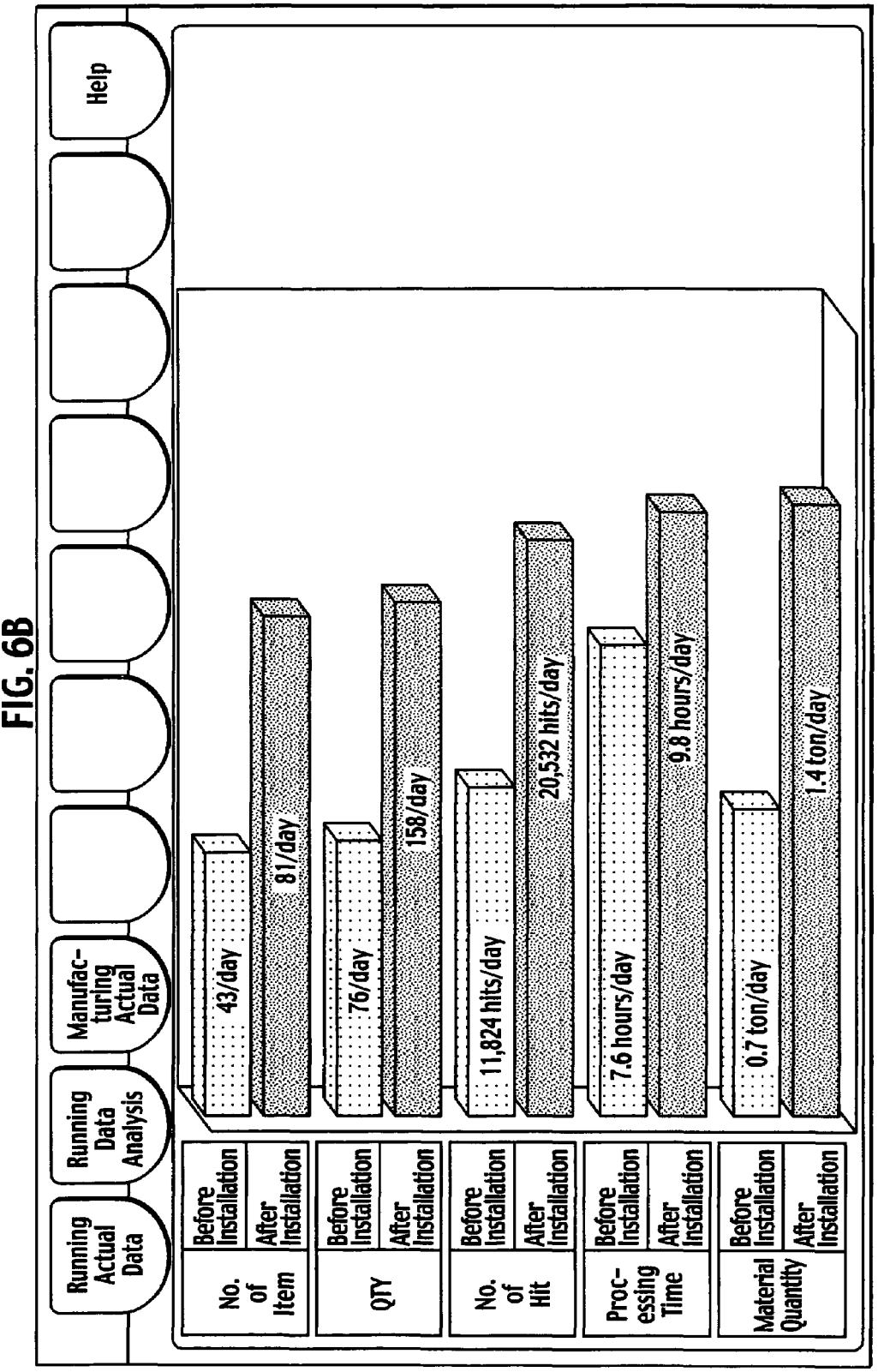
Figure 6C:
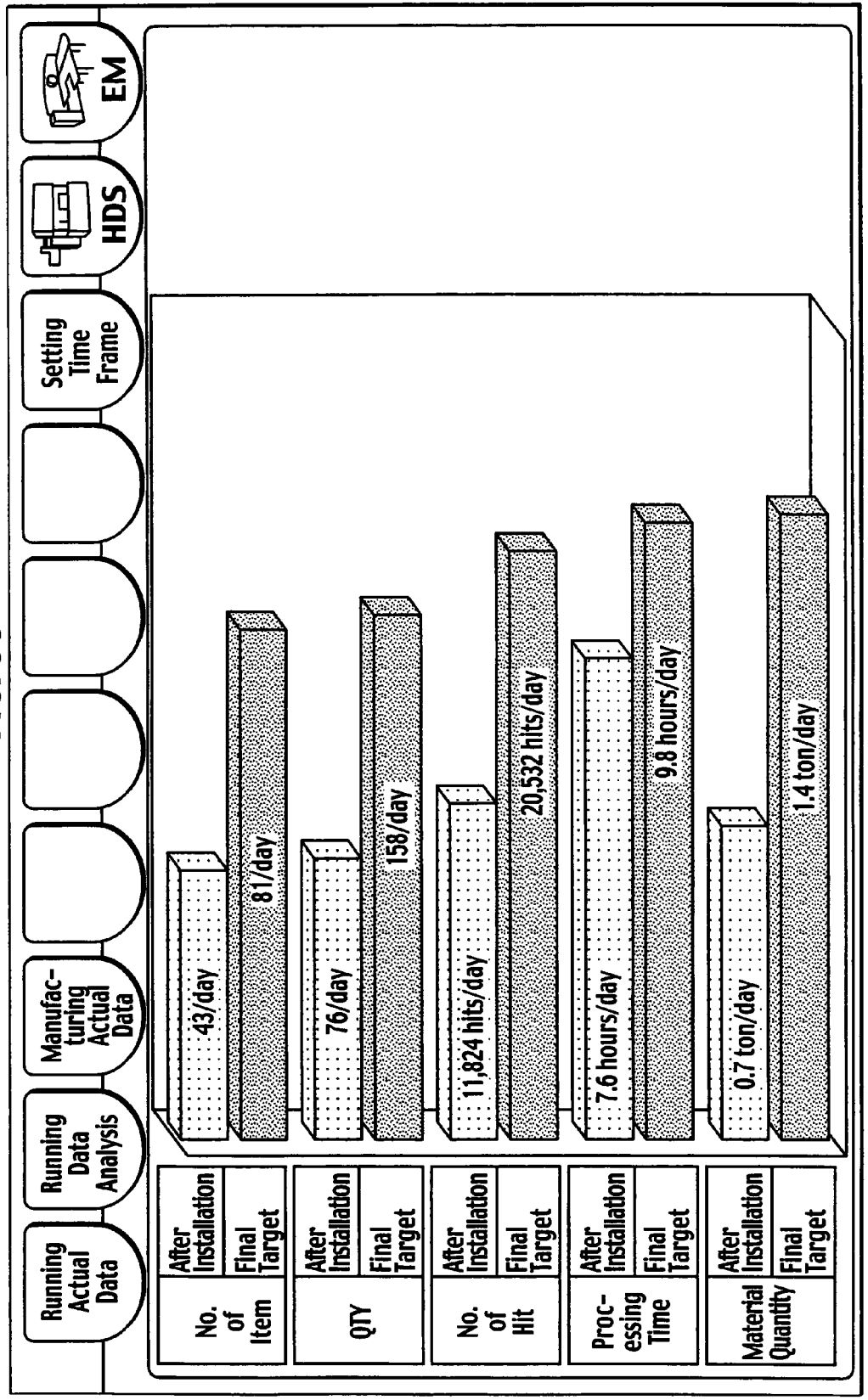

Referring back to FIG. 6A, because each of the post installation results falls short of the target values, additional support is provided to the customer to reduce or eliminate the shortcomings. Although FIG. 6A shows before installation, after installation and final target values, a FIG. 6B showing before installation and after installation values, or a FIG. 6C showing after installation and the final target values can also be provided.

A product analysis based upon the collected data can be used to evaluate the time required to make a product, for example, the customer's main product. The product analysis compares and verifies the effectiveness of the product manufacturing time, before improvement, after improvement and against a target value. As with the machine analysis, the product analysis can compare two different machines to verify the effectiveness of the manufacturing time before and after installing a new machine, while considering the target value. The product analysis can also compare the performance of the same machine, before and after improvement, to verify the effectiveness of the upgrade by comparison to a target value.

Figure 7A:
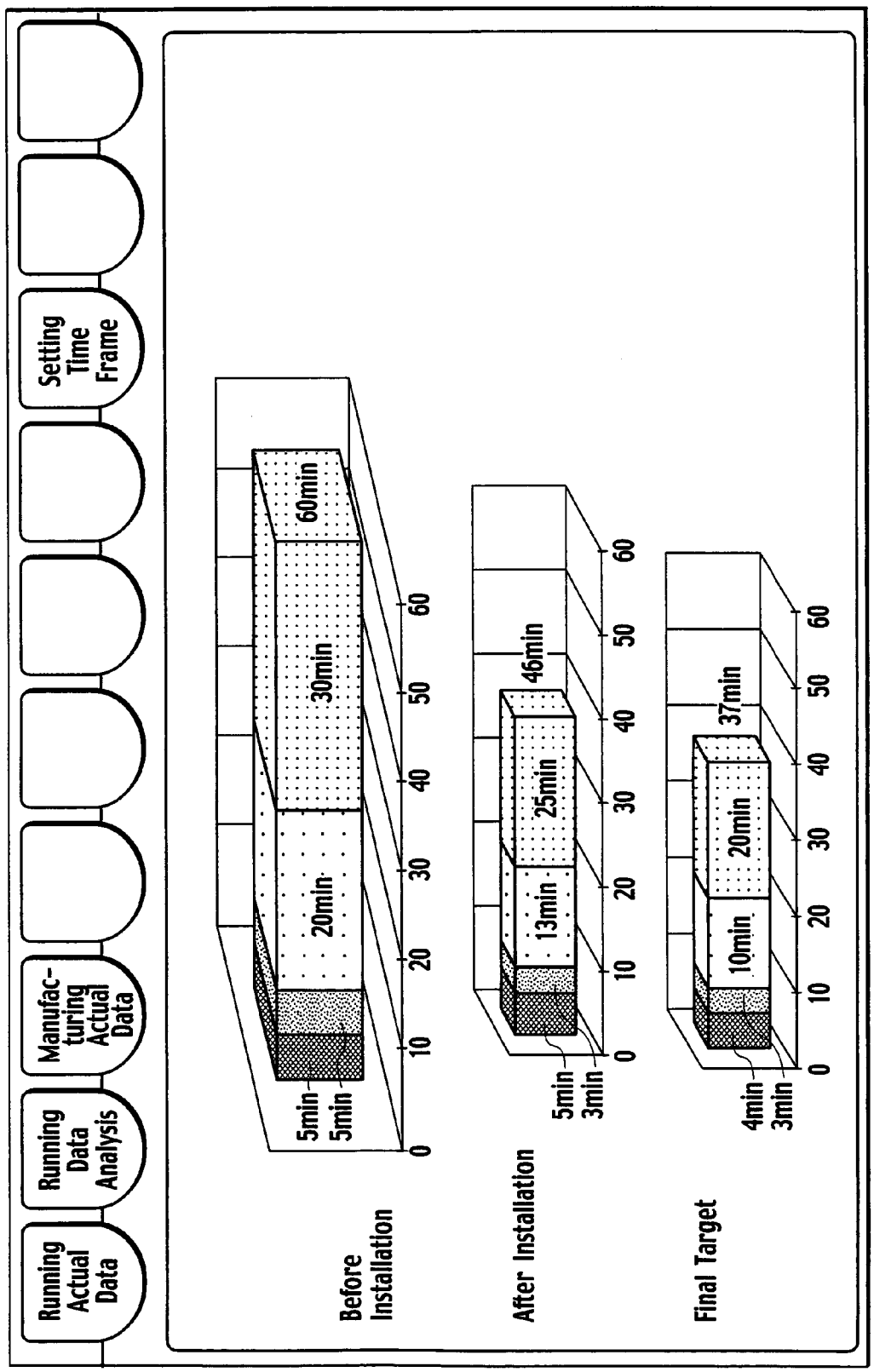
Figure 7C:
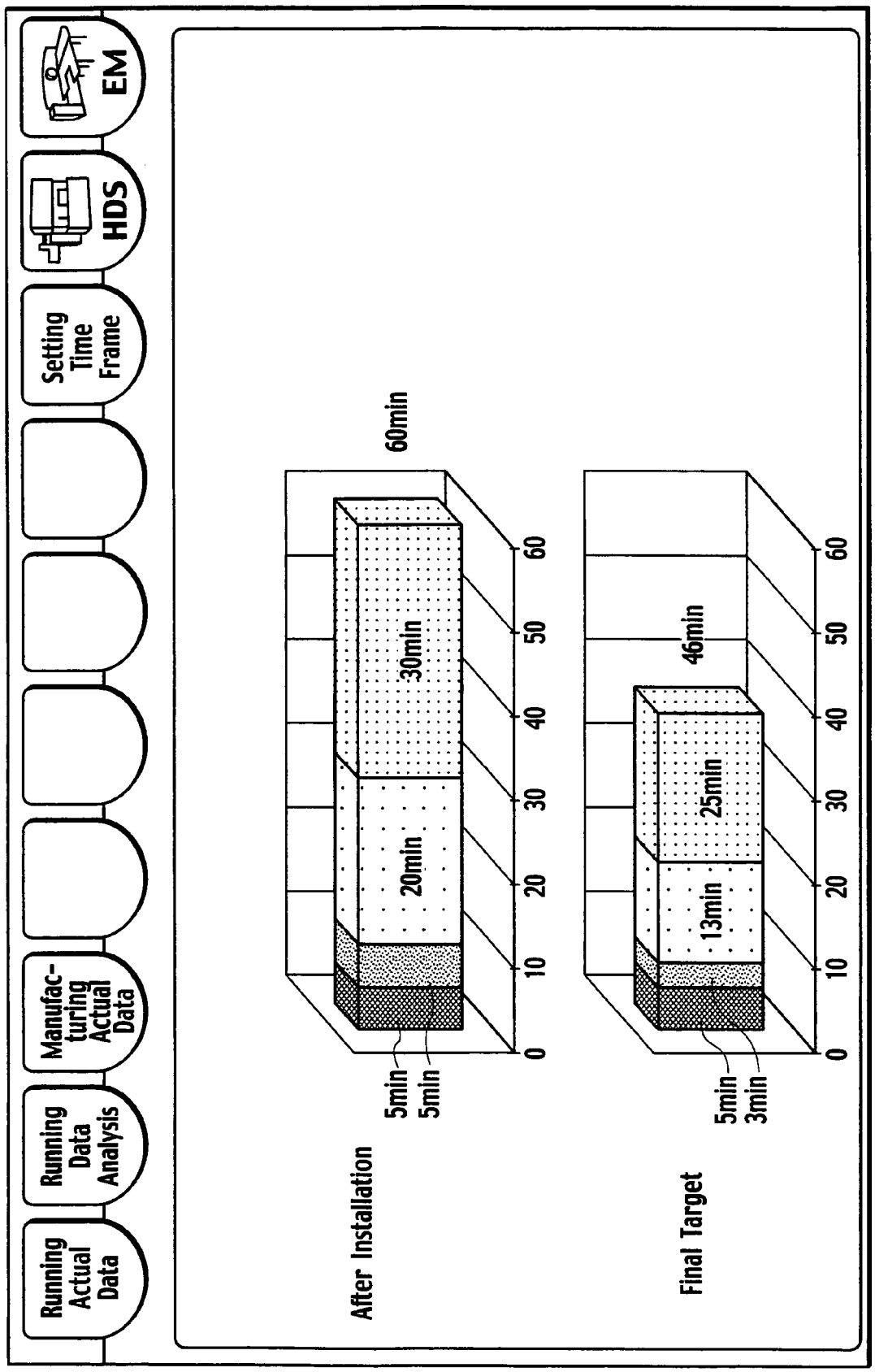

FIG. 7A shows the results of a product analysis. In FIG. 7A, sixty minutes were required to manufacture a product with the old machine, whereas only 46 minutes were required to manufacture the same product with the new machine. The target time is 37 minutes. Thus, support is provided to the customer to reduce/eliminate the extra time required to manufacture the product. A more detailed break down of the time is also shown in FIGS. 7B and 7C. Although FIG. 7A shows before installation, after installation and final target values, a display 7B showing before installation and after installation values, or a display 7C showing after installation and the final target values can also be provided.

A time analysis can be performed to see whether the newly installed machine's processing time is as it should be, based upon the machine manufacturer's knowledge of average processing time for the machine. The time analysis usually takes place with respect to a specific product The machine operating performance (for example, the average number of operating hours or number of hitting times) can be compared with the expected standard performance. In addition, the manufacturing time of a product can be compared with the standard product manufacturing time (based upon data compiled by the machine manufacturer).

A historical data analysis can be used to project and suggest the next maintenance time, such as a supply replacement, based upon the historical maintenance information. That is, if it is known that a tool requires a check up every twelve hours of use and replacement every thirty hours of use, by maintaining a history of the tool's use, the system can inform the customer when the next check up and maintenance times are. For example, if the monitoring indicates that the tool has been used for ten hours, the customer can be informed that after two more hours of use a check up should occur.

Finally, a trend analysis can be performed to verify whether a predicted improvement resulting from the machine upgrade/replacement was accurate. The machine operating performance trends can be observed by storing long term information continuously. The trend analysis can also help discover if a problem exists, for example if the average output drops. For example, a decreasing tend could indicate that maintenance is required.

The last step of the customer support process is presenting a proposal and/or providing a solution, as shown in step S14.

Based upon an analysis of the customer's current operating conditions a proposal may be presented to the customer for increasing profit. That is, the proposal shows how installing a new machine will increase the customer's profit, while accounting for the cost of installation.

In order to prepare the proposal, a customer is selected and the factory is diagnosed. Next, a customer file is created based upon the customer's manufacturing machines, production items, and production quantity to identify increased profit opportunities. The current machine performance is then examined. As described above, the time of the production at the each step using the customer's major product is measured. Finally, the potential increase in profit is discussed with the customer. If the customer is interested in the proposal, a conditional contract is signed to make the customer a partner. The conditional contract permits the customer to return the new machine if the proposed profit increase does not occur or is unacceptable.

After the conditional contract is signed, the installation process occurs. In one embodiment, the installation process includes a pre-installation meeting, and pre-installation training before the machine is delivered. After the machine is installed, a trial run is performed and post-installation training occurs.

After the machine has been installed, the new machine will be supported, as described above, to ensure the proposed profit is achieved, i.e., customer satisfaction is achieved. The support verifies whether the new machine is operating 100% of the time and whether the increased profit target established in the proposal is achieved. Once it is verified that the proposed increased profits has been achieved, a formal final contract may be signed. Otherwise, based upon the conditional contract, the customer can return the new machine. If the sale (machine installation) is a success, the success story can be reported.

The last step of the process may also include providing a solution, such as maintenance. For example, replacement or maintenance of parts may be suggested and/or a maintenance report can be generated.

Because the machine operating information is periodically analyzed, the performance of the machine can be checked. The results can be reported to the customers and if there are problems, solutions can be suggested. For example, defective parts can be discovered if numerous stop time/alarms are detected. Therefore, replacement or maintenance of a part may be needed.

Maintenance services may also be provided. For example when a part is damaged, the damaged condition can be graphically recorded. If the MHD team is not able to solve the problem, the graphics images can be sent to the service center 18, which can respond with advice.

In one embodiment, graphics images are recorded after the repair, and a service work report is created. After the service work is done, it should be reported to the customer.

The present invention can also facilitate order of supplies and parts. Preferably, service or parts are ordered and the date of the service is recorded. The parts can be ordered by the cell phone if the part codes are clear. If not, the parts can be ordered with help from a software application that locates part numbers based upon machine diagrams.

Thus, the present invention monitors machines running at customer sites and provides the customer with adequate support. The present invention tracks the machine status at the customer site and effectively uses the information at a central location to provide product proposals. In one embodiment, the machine status before and after upgrade/installation is researched. The present invention also continuously monitors the machines to check the effectiveness of the installed machines.

Steps for new machine installation can include frequently recording the machine operating conditions, analyzing collected data, suggesting new products to solve problems found through analysis, and ordering new products immediately. After the new products are delivered, installation effectiveness will be continuously monitored.

Maintenance (including preventative maintenance) can include frequently recording the machine operating conditions, analyzing collected data, suggesting machine maintenance or parts to solve any problem found (or predicted) through analysis, immediately ordering and delivering parts that solve the problem, verifying and reporting the problem and solution to the customer, and continuously monitoring the machine to verify that the problem was solved.

In one embodiment, data continuously collected and analyzed includes a machine operation log, graphics images of the operating machine, questions and answers related to the customer, the maintenance history, and the history of purchased parts.

Thus, central management of a customer's machines is enabled. Accordingly, proposals can me made to the customer, and the machine's effectiveness can be checked. Consequently, complete customer support is provided.

Referring now to FIGS. 8-25, still another embodiment will be described in detail hereinafter. FIG. 8 shows another customer support system 100 which is improved.

As shown in FIG. 8, sheet metal machines A, B, , , N can be installed at a customer site. Each of the machines A, B, , , N are provided with respective AMNC 112, 114, 116 which control each of the machines A, B, , , N.

Furthermore, the AMNC 112, 114, 116 are networked together. More specifically, the respective AMNC 112, 114, 116 are connected to a virtual factory management system (VFMS) 102 and a parts data managing component 104. Therefore, working data are transmitted from the parts data managing component 104 to the respective AMNC 112, 114, 116. Standard costs data are transmitted from the parts data managing component 104 to the virtual factory management system 102. Results, processing times, quantity of results and quantity of hits are transmitted from the respective AMNC 112, 114, 116 to the virtual factory management system 102.

A call center 110 diagnosing factory status is connected to the virtual factory management system 102. Standard/result created in the virtual factory management system 102 are transmitted from the virtual factory management system 102 to the call center 110. The call center 110 diagnoses, examines and analyzes the standard/result from the virtual factory management system 102. The diagnosis, the examination and the analysis are transmitted from the call center 110 to the virtual factory management system 102.

A 3D (third dimension) assembly drawing constructing component 106 is connected to the parts data managing component 104 and an automatic CAM component 108 is connected to the 3D assembly drawing constructing component 106. In those connections, standard costs, processing propriety examination and standard processing are transmitted to the 3D assembly drawing constructing component 106. Parts data created in the 3D assembly drawing constructing component 106 are transmitted to the parts data managing component 104.

Figure 9:
FIG. 9 shows processes of a model manufacturing method.

FIG. 9 shows sheet metal manufacturing process model. The manufacturing of the sheet metal includes many varied processes with working thin raw material. The proceeded manufacturing processes or proceeded manufacturing sequences are varied according to character of parts or purpose of parts.

Figure 10:
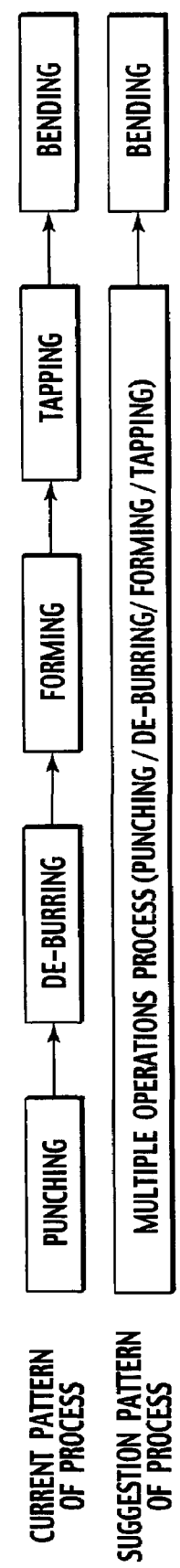
FIG. 10 shows varied processes of a mode manufacturing method.

FIG. 10 shows a specific sheet metal manufacturing process of a specific sheet metal parts, replacing the block diagram shown in FIG. 9. In the drawing, "current pattern of process" means manufacturing processes according to currently installed machine. The current pattern of processes are independently proceeded. On the contrary, the other pattern of process, namely "suggestion pattern of process" means another manufacturing processes according to a suggested machine to manufacture the same parts of the current pattern of process. In this suggestion pattern, some kinds of processes are united as shown in the drawing. In this embodiment, punching process, de-burring process, forming process and tapping process are united as a multiple operations process.

The sheet metal manufacturing processes of the sheet metal parts are proceeded by many kinds of workings by operators and by machines. Fully automatic manufacturing processes, semi-automatic manufacturing processes or manpower manufacturing processes can be sorted. A model process of the manufacturing for the sheet metal parts is defined with the block diagram as shown in FIG. 11.

Figure 11:
FIG. 11 shows processes of a mode manufacturing method.
Figure 12:
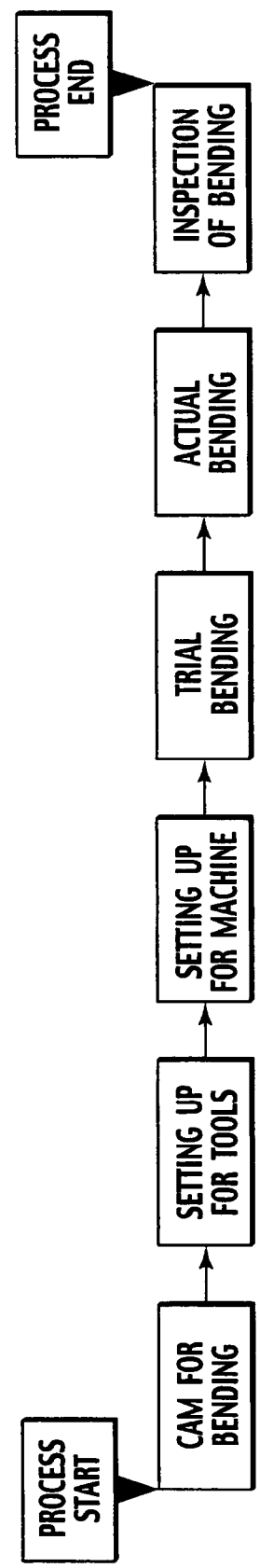
FIG. 12 shows varied processes of a mode manufacturing method.

FIG. 12 shows a bending process which is divided for many workings, replacing the block diagram shown in FIG. 11. The CAM for bending shown in FIG. 12 corresponds to the working 1 shown in FIG. 11. The setting up for tools shown in FIG. 12 corresponds to the working 2 shown in FIG. 11. Furthermore, the model process of the manufacturing for the sheet metal parts includes the following workings; setting up for machine, trial bending, actual bending, inspection of bending as shown in FIG. 12.

In the model process of the manufacturing for the sheet metal parts shown in FIG. 12, data for the standard and result are calculated and collected according to the respective working 1 to the working N, actually, according to the respective CAM for bending, setting up for tools, setting up for machine, the trial bending, the actual bending, the inspection of bending shown in FIG. 12. As described above, since one process as the bending process is further specifically divided into many workings shown in FIG. 12, accurate diagnosis, examination and analysis can be available for the customers.

Figure 13A:
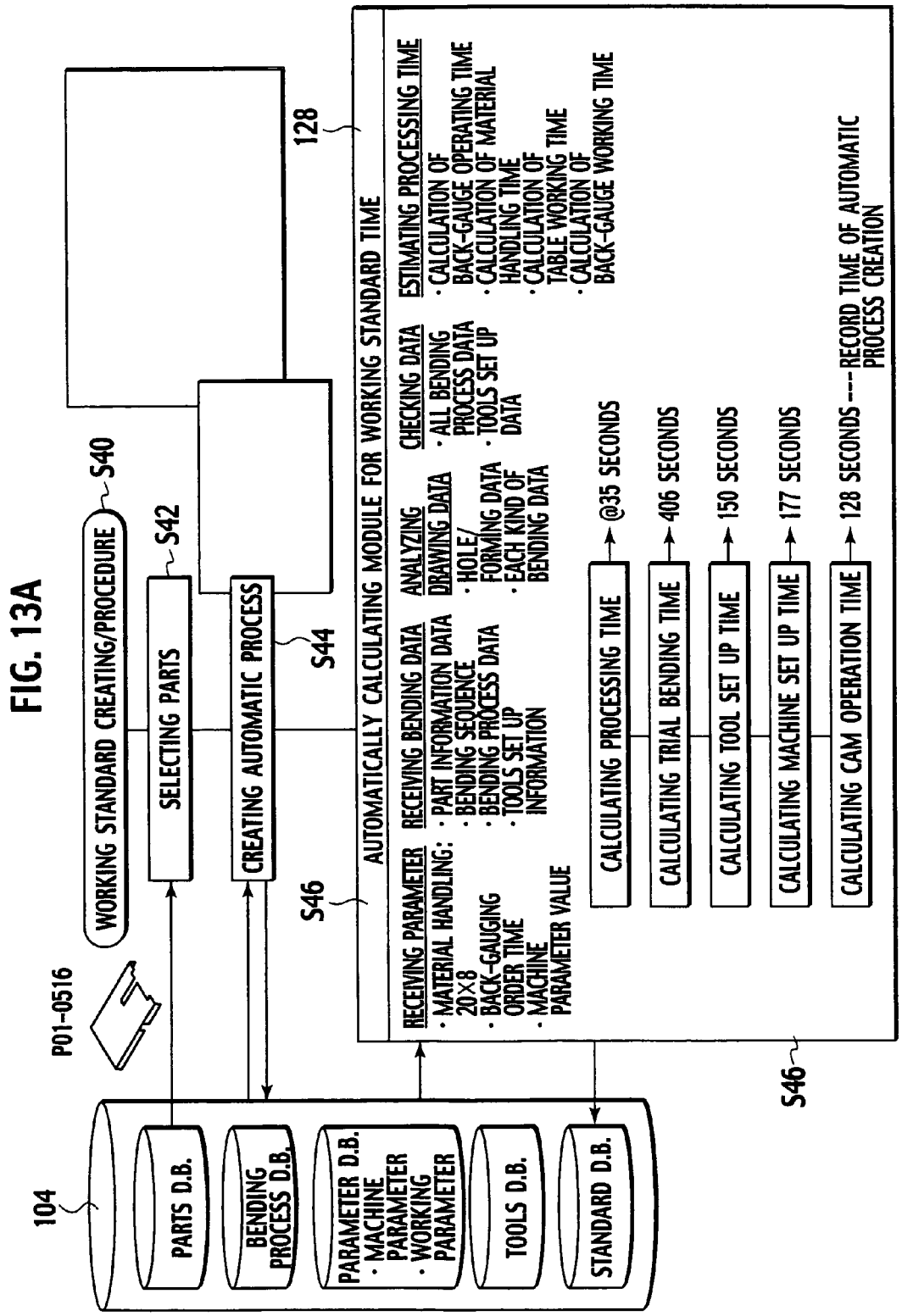
FIGS. 13A and 13B show working standard creating and processing block diagrams and flows.
Figure 13B:
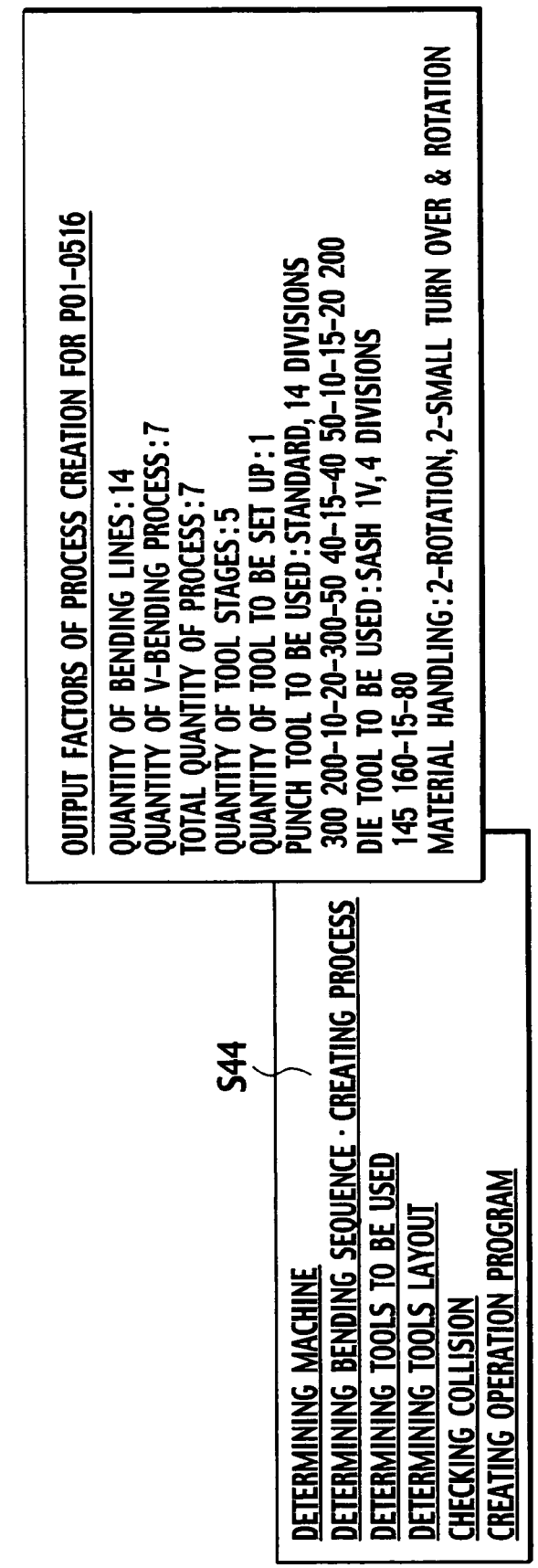

Referring now to FIGS. 13A and 13B, a working standard creation/procedure (step S40) will be described hereinbelow. FIGS. 13A and 13B show an example creation of standard time of each part in the bending process. In a step S46 shown in FIG. 13A, an automatically calculating module for the working standard time 128 proceeds following procedures; receiving parameter, receiving bending data, analyzing drawing data, checking data, and estimating processing time. The procedure of the receiving parameter includes material handling time, back-gauging order time, machine parameter value. The procedure of the receiving bending data includes parts information data, bending sequence, bending process data, tools set up information. The procedure of the analyzing drawing data includes hole/forming data, each kind of bending data. The procedure of the checking data includes all bending process data and tools set up data. The procedure of the estimating processing time includes calculation of the back-gauge operating time, calculation of the material-handling time, calculation of the table working time, and the back-gauge working time.

The automatically calculating module for the working standard time 128 automatically calculates the standard working time of each parts. FIG. 13A shows an example of standard working time of bending process.

First, when the automatically calculating module for the working standard time 128 recognizes that a target part (for example, part reference number: P01-0516) having a working intention attribute (generic character of working purpose) is registered at the parts data base (PARTS D.B.) of the parts data managing component 104, the target part is automatically transmitted from the PARTS D.B. to the module 128

(S42). In another method, un operator can manually search the target part in the PARTS D.B. and transmit it to the module 128.

In the next step S44 shown in FIG. 13A, following procedures are achieved. The specific procedures in the step S44 are displayed in FIG. 13B, namely; determining machine, determining bending sequence/creating process, determining tools to be used, determining tools layout, checking collision, creating operation program. Further specific result of created process for the target part P01-0516 are shown at the right end table of FIG. 13B.

Next, each working standard times in the bending process is automatically calculated by the module 128.

At the calculation procedure of the standard working time, firstly, machine parameters including axis speed, slowdown speed and pressing time, material handling parameter, parameter of back gauging time for order, setting up parameter are gained by the PARAMETER D.B. of the parts data managing component 104. Secondly, the created bending sequence information, bending kind information and other necessary information for bending are checked. Then each working standard times, specifically, processing time, trial bending time, tools set up time, machine set up time, CAM operation time are calculated.

The calculated times are 35 seconds, 406 seconds, 150 seconds, 177 seconds and 128 seconds for the each working as shown in FIG. 13A. The above calculated times of each workings are respectively and independently registered in the STANDARD D. B. of the parts data managing component 104.

FIG. 14 shows an example of result time creation and collection for bending process of the target part P01-0516. The working result collecting/procedure (S50) on each manufacturing processes are automatically proceeded by a working result time collecting module installed in each of the AMNC 112, 114, 116.

By a standard type of bending machine, the bending process is achieved many manpower by operator in addition to the machine-self operation. Even though in this case, the AMNC 112, 114, 116 can recognize all of the manpower by operator in bending process and collect the result working times on each working proceeded in each of the machine A, B, , , N, respectively.

Figure 26:
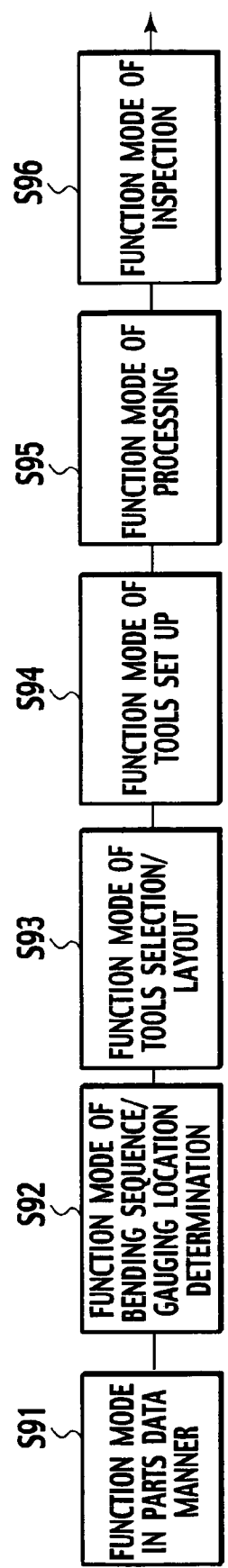
FIG. 26 shows processes of a manual manufacturing sequence.

The bending processes achieved by manpower by operator are sorted into many steps shown in FIG. 26. The bending processes achieved by manpower by operator are divided into each operating function mode of graphs S91 to S96. Automatically, each bending processes S91 to S96 are converted into digital data and are input into the virtual factory management system 102 and the parts data managing component 104.

The AMNC 112, 114, 116 can display all parts to be manufactured in a graphical catalogue through the network connected with the parts data managing component 104. The AMNC can call the specified part among the all parts to be manufactured in a graphical catalogue. The AMNC can also call the specified part by bar code or IC tag (S52)

Since the called part data includes bending program automatically created at the standard creation, the bending sequence and back-gauging location can be confirmed and checked at the CAM function mode of the AMNC (S54). Other program other than the above program can directly be created by another method.

At the tools set up process (S56), tools to be used and tool layout are checked in the tools set up function mode of the AMNC, and actually the tools are set in the machine according to the guidance of the tool navigation system. Trial bending processing is proceeded by confirming accuracy on the function mode of bending processing (adjustment) (S58). In the function mode of bending processing, the bending processing is continuously and stabilizingly performed (S60).

The accuracy of the product is confirmed on the function mode of confirmation (S64). Then the above described data are registered (S66) in the result data base (RESULT D. B.) of the virtual factory management system 102. Then the result time creation and collection for bending process of the target part P01-0516 is terminated.

Figure 15:
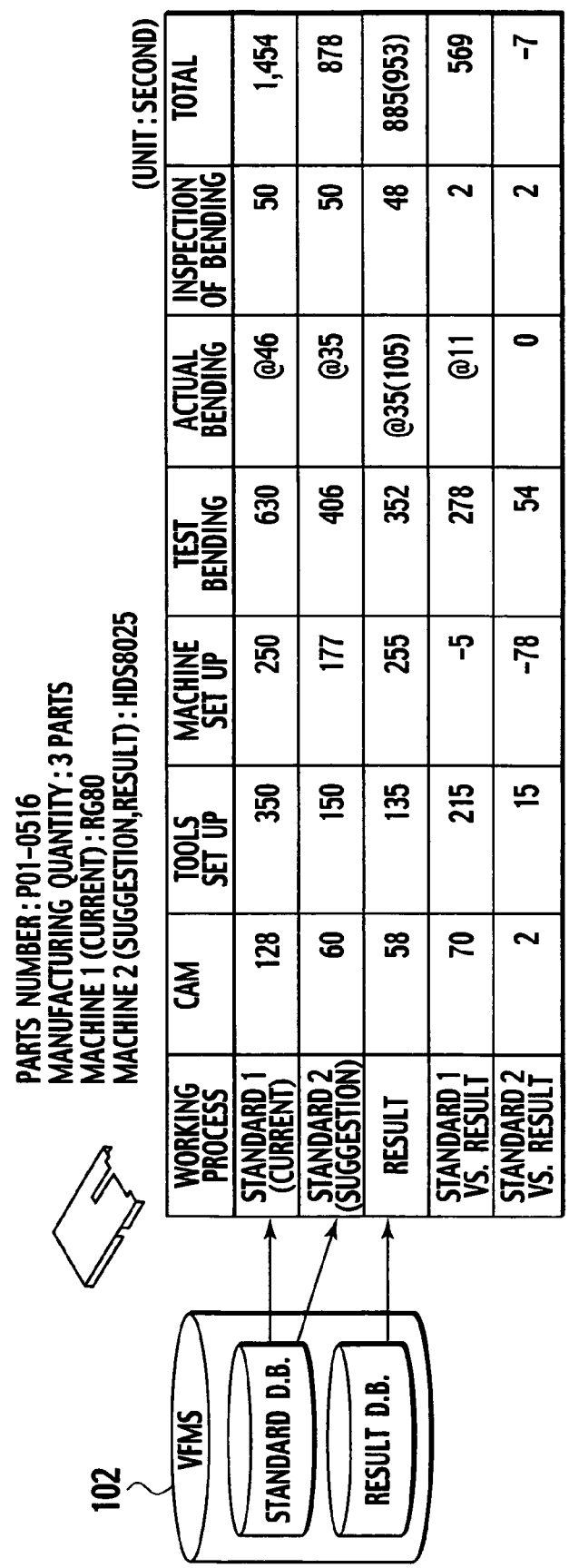
FIG. 15 shows a table of working time.

FIG. 15 shows an example of comparing between standard working time VS. result working time which are automatically calculated for bending process of the target part P01-0516. In the table, @ means working time at one quantity of the target part. The figures in the ( ) are in case of three quantity of the part. Standard 1 means the working time calculated as produced in the current machine, and standard 2 means the working time calculated as produced in the suggested machine.

The "standard 1 VS. result" in the penultimate line of the table shown in FIG. 15 is calculated in a manner of "standard 1−|(minus) result" and means and expressing the shortening of working time by improvement. On the other hand, the "standard 2 VS. result" in the bottom line of the table shown in FIG. 15 is calculated in a manner of "standard 2−(minus) result"

and expressing degree of achievement against the target (standard).

Figure 16:
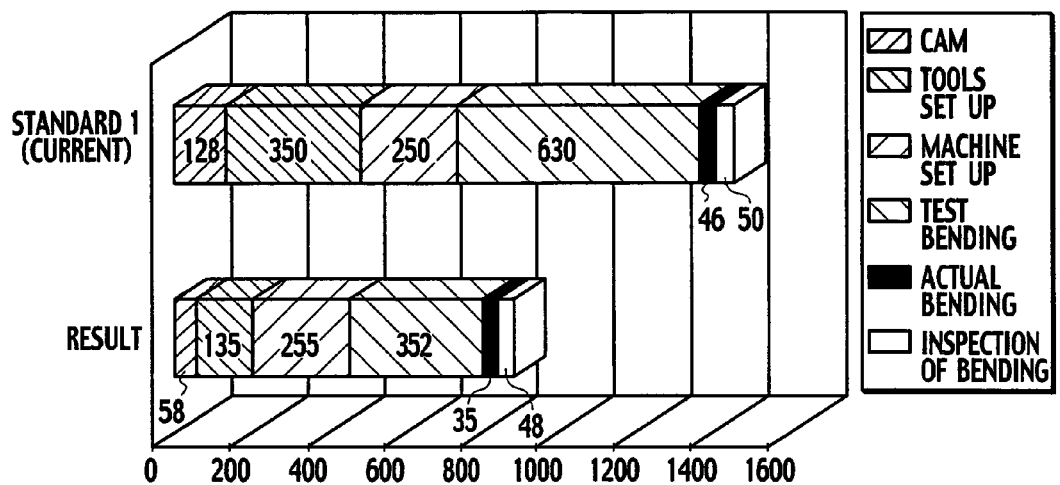
FIGS. 16 and 17 show graphs of working time.
Figure 17:
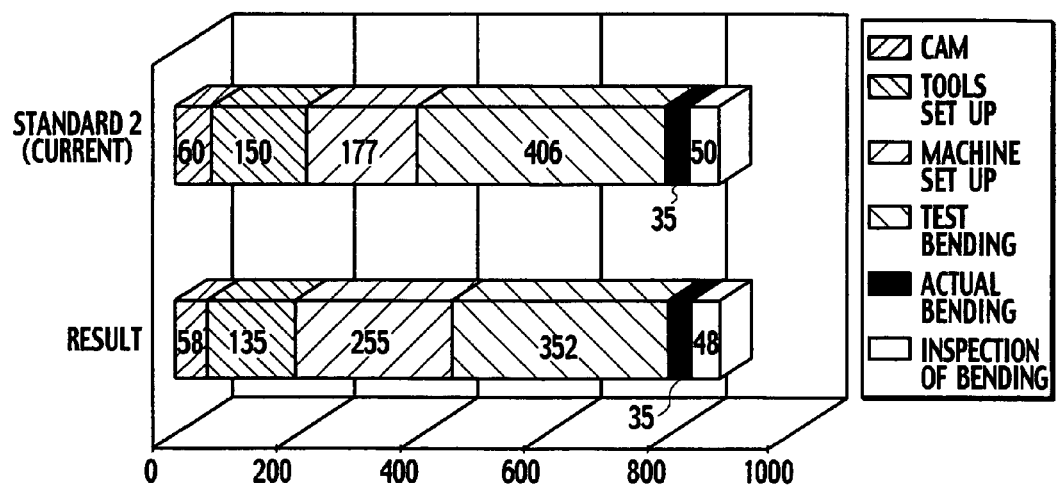

FIGS. 16 and 17 show examples of display of comparing between "current standard VS. result" and "suggested standard VS. result", respectively.

FIGS. 18 shows a specific cost table of a specific process. Manufacturing cost in each manufacturing steps of the sheet metal parts is calculated the following formula.

Manufacturing cost=(machine working time)×(machine charge) +(add) (operator working time)× (operator charge)

Figure 19:
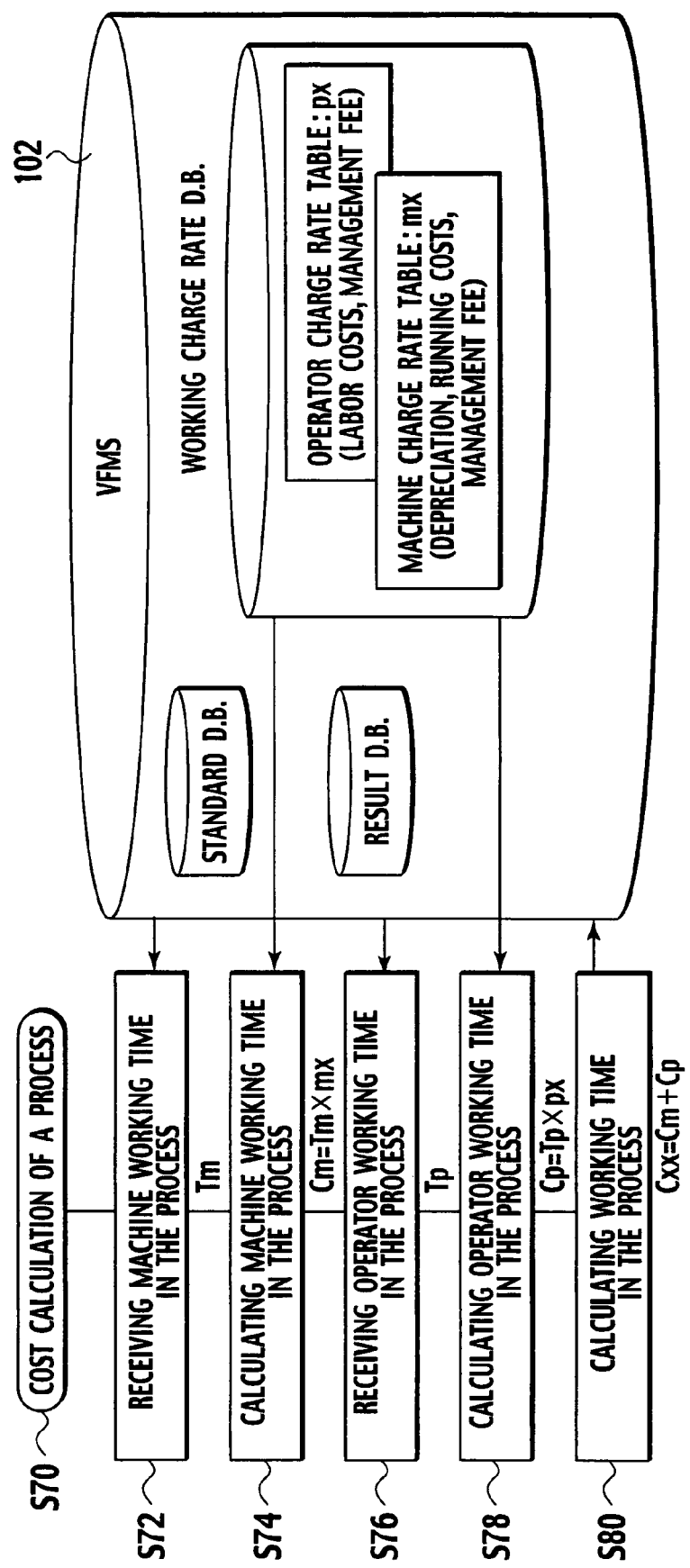
FIG. 19 shows calculating module of working time.

FIG. 19 shows a block diagram of cost calculating of a process where the working time and the costs are calculated.

FIG. 20 shows an example of comparing between standard cost VS. result cost which are automatically calculated for bending process of the target part P01-0516. In the table, @ means cost at one quantity of the target part. The figures in the ( ) are in case of three quantity of the part. Standard 1 means the cost calculated as produced in the current machine, and standard 2 means the cost calculated as produced in the suggested machine.

The "standard 1 VS. result" in the penultimate line of the table shown in FIG. 20 is calculated in a manner of "standard 1−(minus) result" and means and expressing the shortening of working time by improvement. On the other hand, the "standard 2 VS. result" in the bottom line of the table shown in FIG. 20 is calculated in a manner of "standard 2−(minus) result" and expressing degree of achievement against the target (standard).

Figure 21:
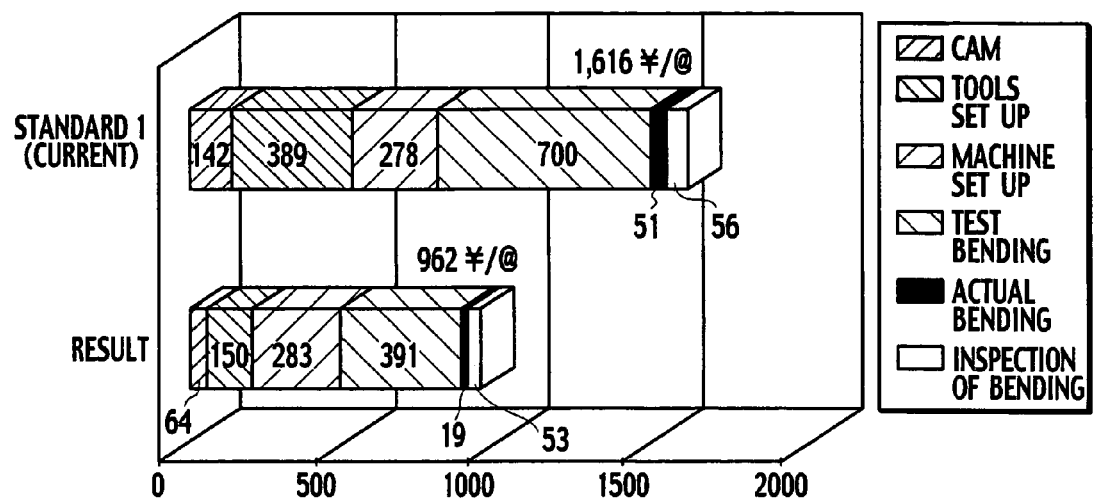
FIGS. 21 and 22 show graphs of working cost.
Figure 22:
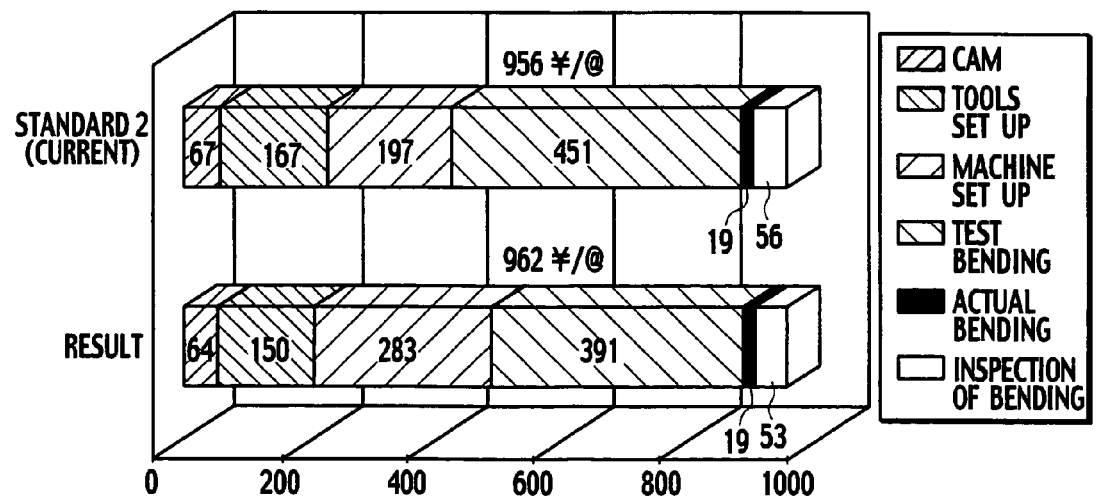

FIGS. 21 and 22 show examples of display of comparing between "current standard VS. result" and "suggested standard VS. result", respectively.

FIG. 23 shows automatically created standard time and cost on each working processes and on each parts at a graph.

FIG. 24 shows automatically created result time and cost on each working processes and on each parts at a graph. A working result cost of a specific parts is calculated by adding the each cost of each processes displayed in FIG. 24. Therefore, profit increasing is gained by comparing the current cost (¥643) and the result cost (¥332) shown in FIG. 25. In this case, the profit increase depends on the comparison (¥311).

The above descriptions referring to FIGS. 8~25 are structures and operations of the other embodiment of the customer support system 100 according to the present invention. The procedure in the customer support system 100 will be described hereinbelow, for example a target part P01-0516 of a sheet metal part, especially the bending process other than the punching process, the de-burring process, forming process, the tapping process and other process.

First of all, when an operator select the target part P01-0516 on the display of the AMNC 112, the working standard creating/procedure S40 shown in FIGS. 13A and 13B is proceeded by the automatic CAM component 108, the 3D (third dimension) assembly drawing constructing component 106 and the parts data managing component 104, then the working standard of the target part P01-0516 is stored in into the standard data base (STANDARD D.B.) in the parts data managing component 104 shown in FIGS. 13A and 13B and transmitted to the virtual factory management system 102 and stored in into the standard data base (STANDARD D.B.) in the virtual factory management system 102 and transmitted through the virtual factory management system 102 to the call center 110 to be stored therein as shown in FIG. 8. The detailed process is shown in FIGS. 13A and 13B and as described hereinabove.

Next, the working result collection/procedure S50 shown in FIG. 14 is proceeded by the automatic CAM component 108, the 3D (third dimension) assembly drawing constructing component 106 and the parts data managing component 104, then the working result of the target part P01-0516 is stored in the result data base (RESULT D. B.) shown in FIG. 14 and transmitted through the virtual factory management system 102 to the call center 110 to be stored therein as shown in FIG. 8. The detailed process is shown in FIG. 14 and as described hereinabove.

Then the working standard 1 (current), the working standard 2 (suggestion), the working result, the working standard 1 VS. the working result and the working standard 2 VS. the working result are displayed as a table as shown in FIG. 15 in a display (for example CRT) installed in the virtual factory management system 102. Here, working standard 1 (current) is gained by the operation by a current machine (for example RG80 (machine name)) which is installed in the factory. On the contrary, the working standard 2 (suggestion) and the working result are gained by the operation by a new machine (for example HDS8025 (machine name)) which is installed another location in the factory or on the sales promoted as a suggestion or proposal.

When the operator clicks or operates the display of the virtual factory management system 102, the table shown in FIG. 15 is changed into the graphs shown in FIGS. 16 and 17. Then the operator can easily understand the working result is shoot time in comparing to the standard 1 (current).

Furthermore, in case the operator wants to know comparisons of costs, the system 100 calculates costs of the target part P01-0516 by the calculating formula stated hereinabove and using the table and flow shown in FIGS. 18 and 19.

Then the working standard cost 1 (current), the working standard cost 2 (suggestion), the working cost result, the working standard cost 1 VS. the working result cost and the working standard cost 2 VS. the working result cost are displayed as a table as shown in FIG. 20 in a display (for example CRT) installed in the virtual factory management system 102.

When the operator clicks or operates the display of the virtual factory management system 102, the table shown in FIG. 20 is changed into the graphs shown in FIGS. 21 and 22.

Then the operator can easily understand the working result cost (962¥/@) is decreased in comparing to the standard cost 1 (current) (1,616¥/@).

Furthermore the operator clicks or operates the display of the virtual factory management system 102, the table shown in FIG. 23 is displayed in the virtual factory management system 102. For example, current punching cost of a side cover among the other parts (front cover, stay column, base part, attachment plate, and insert part) is ¥99 (punching machine cost) and ¥280 (operator cost), totally ¥379. Current bending cost of the side cover is ¥96 (bending machine cost) and ¥168 (operator cost), totally ¥264. Then the total cost of the side cover is ¥643(¥379+¥264).

On the other hand, result punching cost of the side cover as shown in FIG. 24 is ¥60 (punching machine cost) and ¥140 (operator cost), totally ¥200. Result bending cost of the side cover is ¥48 (bending machine cost) and ¥84 (operator cost), totally ¥132. Then the total result cost of the side cover is ¥332(¥200+¥132).

Figure 25:
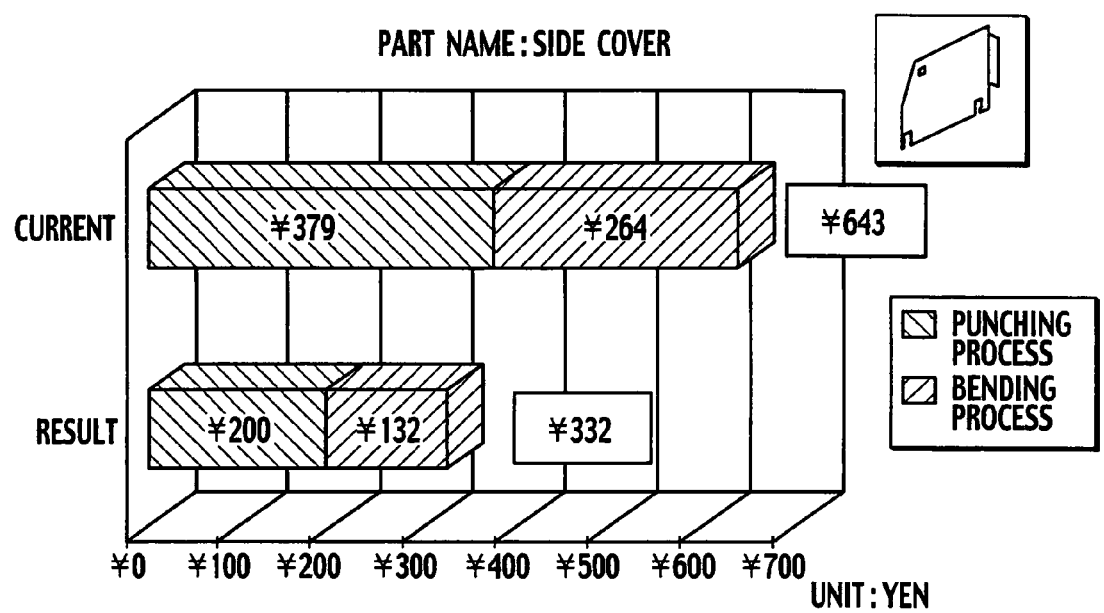
FIG. 25 shows a graph of costs

Then the operator can recognize that the factory can gain the profit increase ¥311(¥643−¥332) as shown in FIG. 25, in case the target part named the side cover is manufactured by the new machine, HDS8025 (machine name) instead of the current machine, RG80 (machine name) which is already installed and used in the factory.

As described above, the present invention provides a customer support method and a customer support system 100 where a factory can easily know how to change machines to be used to gain the profit increase.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs operating on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Entire contents of U.S. patent application Ser. No. 10/936,498 (filed on Sep. 9, 2004) are included in the specification of the present application as reference.

The invention claimed is:

1. A system for providing customer support of newly upgraded machines or newly installed machines, the system comprising:
   an operating data monitor that monitors and collects data from a plurality of machines located at a customer site; and
   a call center that receives the collected data from the operating data monitor, including data for each process stage, and records the data for analysis, the analysis comprising:
   collecting data associated with individual process stages of the old machines and individual process stages of the newly upgraded or installed machines;
   distinguishing data corresponding to the old machines and to the newly upgraded or installed machines;
   performing a comparison of the measurements of efficiency of each of a plurality of process stages of the newly upgraded or installed machines and each of a plurality of process stages of the old machines;
   measuring the efficiency of each of a plurality of process stages of the old machines and each of a plurality of process stages of the newly upgraded or installed machines; outputting a measurement of the effectiveness of the newly upgraded or installed machines for each of the plurality of process stages based upon the comparison; and
   calculating tools set up time and newly upgraded or installed machine set up time of a sheet metal manufacturing process based on predetermined machine parameters comprising axis speed and slowdown speed.

2. The system of claim 1, further comprising a plurality of portable devices that communicate with the call center, the portable devices being operable by sales representative or service personnel.

3. The system of claim 2, in which one of the portable devices collects data for each stage of a process by transmitting, to the call center, an indication of a beginning of the process, and when the process completes, transmitting to the call center an indication of an ending of the process.

4. The system of claim 1, in which the comparison comprises comparing a manufacturing time for a product prior to an upgrade with a manufacturing time for the product after the upgrade.

5. The system of claim 1, in which the comparison comprises comparing a newly installed machine's performance with an old machine's performance.

6. The system of claim 1, in which the comparison comprises comparing a processing time for a product on a newly installed machine with a known average processing time for the product.

7. The system of claim 1, in which the data comprises a machine operation log and graphics images of the operating machine.

8. The system of claim 1, in which the call center prepares a proposal based upon the analysis, the proposal being presentable to a customer.

9. The system of claim 1, further comprising:
   comparing the data associated with individual process stages of newly upgraded or installed machines to a target value,
   wherein the target value is derived from a time study algorithm and time study data, and
   wherein the time study data is derived from a simulation which verifies process stages employed in a manufacturing process.

10. The system of claim 1, further comprising:
    estimating a manufacturing time and efficiency of the individual process stages, based on data from a simulation of the individual process stages.

11. The system of claim 1, further comprising:
    calculating trial bending time and CAM operation time of the sheet metal manufacturing process based on predetermined machine parameters comprising pressing time, material handling, and back gauging time.

12. A customer support system, comprising:
    a plurality of numerical controllers installed in a corresponding plurality of machines to be monitored, the plurality of machines being located in at least one customer facility;
    an automatic CAM component for creating a standard working process and calculating a corresponding standard working time; and
    a virtual factory manager for calculating a result cost of each part using actual working data derived from actual manufacturing by each of the machines, the virtual factory manager further calculating a standard cost of each part using the standard working time;
    wherein the virtual factory manager performs a comparison of the measurements of efficiency of each of a plurality of process stages of the newly upgraded or installed machines and each of a plurality of process stages of the old machines;
    wherein the virtual factory manager measures the efficiency of each of a plurality of process stages of the old machines and each of a plurality of process stages of the newly upgraded or installed machines;
    wherein the virtual factory manager collects data associated with individual process stages of the old machines and individual process stages of the newly upgraded or installed machines;
    wherein the virtual factory manager distinguishes data corresponding to old machines and to newly upgraded or installed machines;
    wherein the virtual factory manager outputs a measurement of the effectiveness of the newly upgraded or installed machines for each of the plurality of process stages based upon the comparison;
    wherein the standard cost comprises a cost of each part calculated as produced by the old machines;
    wherein the result cost comprises a cost of each part calculated as produced by the newly upgraded or installed machines; and
    wherein the virtual factory manager calculates tools set up time, newly upgraded or installed machine set up time, and CAM operation time of a sheet metal manufacturing process based on predetermined machine parameters.

13. The system of claim 12, further comprising:
    a call center for analyzing the comparing of the standard cost and the result cost received from the virtual factory manager,
    wherein the call center is configured to provide the analysis to the customer through a display at the at least one customer facility.

14. The system of claim 13, wherein data of the result working process is automatically obtained in the numerical controllers of the corresponding machine.

15. The system of claim 13, wherein when the analysis indicates a profit increase, the call center proposes to the customer through the display to change a result working process into the standard working process.

16. The system of claim 12, wherein the actual working data comprises a result working process and a result working time for each of the machines.

17. The system of claim 12, wherein a portion of the actual working data for at least one of the machines is determined by an operator and manually entered into the corresponding numerical controller.

18. The customer support system of claim 12, wherein the virtual factory manager compares the data associated with individual process stages of newly upgraded or installed machines to a target value, wherein the target value is derived from a time study algorithm and time study data, and wherein the time study data is derived from a simulation which verifies process stages employed in a manufacturing process.

19. The customer support system of claim 12, wherein the virtual factory manager estimates a manufacturing time and efficiency of the individual process stages, based on data from a simulation of the individual process stages.

20. The customer support system of claim 12, wherein the virtual factory manager calculates trial bending time of the sheet metal manufacturing process based on predetermined machine parameters comprising axis speed, slowdown speed, pressing time, material handling, and back gauging time.

* * * * *